US012073458B2

(12) United States Patent
Woodyard et al.

(10) Patent No.: US 12,073,458 B2
(45) Date of Patent: Aug. 27, 2024

(54) COMPUTER-IMPLEMENTED METHODS AND SYSTEM FOR CUSTOMIZED INTERACTIVE IMAGE COLLECTION BASED ON CUSTOMER DATA

(71) Applicant: Block, Inc., San Francisco, CA (US)

(72) Inventors: Christopher Woodyard, Hoboken, NJ (US); Stephanie Grodin, Brooklyn, NY (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/546,032

(22) Filed: Dec. 8, 2021

(65) Prior Publication Data

US 2022/0101420 A1 Mar. 31, 2022

Related U.S. Application Data

(63) Continuation of application No. 16/177,020, filed on Oct. 31, 2018, now Pat. No. 11,210,730.

(51) Int. Cl.
*G06Q 30/00* (2023.01)
*G06F 3/0482* (2013.01)
(Continued)

(52) U.S. Cl.
CPC ....... *G06Q 30/0643* (2013.01); *G06F 3/0482* (2013.01); *G06F 3/0484* (2013.01);
(Continued)

(58) Field of Classification Search
CPC ........... G06Q 30/0643; G06Q 30/0603; G06Q 30/0631; G06Q 30/0635; G06F 3/0482
(Continued)

(56) References Cited

U.S. PATENT DOCUMENTS 5,276,311 A 1/1994 Hennige
5,530,232 A 6/1996 Taylor
(Continued)

FOREIGN PATENT DOCUMENTS

EP 1 107 198 A2 1/2018
WO 2009/111857 A1 9/2019

OTHER PUBLICATIONS

Cho, H., & Fiorito, S. S. (2009). Acceptance of online customization for apparel shopping. International Journal of Retail & Distribution Management, 37(5), 389-407. doi:http://dx.doi.org/10.1108/09590550910954892 (Year: 2009).*

(Continued)

*Primary Examiner* — Arielle E Weiner
(74) *Attorney, Agent, or Firm* — Lee & Hayes, P.C.

(57) ABSTRACT

Systems and methods for purchasing items using a payment processing service (PPS) that checks inventory of merchant(s) and generates interactive components displayed by a third-party platform. Inventory data for merchants is stored by the PPS. The PPS receives an indication of input to a graphical user interface (GUI) presented by the third-party platform. The input represents a desire of a customer to purchase an item from a brick-and-mortar store of a particular merchant. The PPS determines that the merchant does not have the item available but determines it is available at a similar merchant's store. The PPS generates an interactive component comprising an image of the item and a selectable control to be used to initiate purchase from the similar merchant. The interactive component is displayed via the GUI, overlaid with customer-specific item variant information. Selection of the component allows the customer to add the item to a cart.

20 Claims, 13 Drawing Sheets

(51) Int. Cl.
  *G06F 3/0484* (2022.01)
  *G06Q 20/12* (2012.01)
  *G06Q 30/0601* (2023.01)

(52) U.S. Cl.
  CPC ......... *G06Q 20/12* (2013.01); *G06Q 30/0603* (2013.01); *G06Q 30/0631* (2013.01); *G06Q 30/0635* (2013.01)

(58) Field of Classification Search
  USPC ...................................................... 705/26.7
  See application file for complete search history.

(56) References Cited

U.S. PATENT DOCUMENTS

| | | |
|---|---|---|
| 5,585,787 A | 12/1996 | Wallerstein |
| 5,878,337 A | 3/1999 | Joao et al. |
| 6,175,922 B1 | 1/2001 | Wang |
| 6,422,462 B1 | 7/2002 | Cohen |
| 6,764,005 B2 | 7/2004 | Cooper |
| 7,133,837 B1* | 11/2006 | Barnes, Jr. ......... G06Q 30/0635 705/26.81 |
| 7,764,185 B1 | 7/2010 | Manz et al. |
| 7,805,378 B2 | 9/2010 | Berardi et al. |
| 8,190,514 B2 | 5/2012 | Bishop et al. |
| 8,459,544 B2 | 6/2013 | Casey et al. |
| 8,498,900 B1 | 7/2013 | Spirin et al. |
| 8,577,803 B2 | 11/2013 | Chatterjee et al. |
| 8,602,296 B1 | 12/2013 | Velline et al. |
| 8,712,854 B1 | 4/2014 | Rafferty et al. |
| 8,719,104 B1 | 5/2014 | Endresen |
| 8,732,085 B2 | 5/2014 | Bennett |
| 8,775,401 B2 | 7/2014 | Zhou et al. |
| 8,831,998 B1 | 9/2014 | Cramer et al. |
| 8,972,298 B2 | 3/2015 | Kunz et al. |
| 9,092,767 B1 | 7/2015 | Andrews et al. |
| 9,092,776 B2 | 7/2015 | Dessert |
| 9,092,828 B2 | 7/2015 | Hosp |
| 9,280,560 B1 | 3/2016 | Dube et al. |
| 9,505,554 B1 | 11/2016 | Kong et al. |
| 9,779,447 B2 | 10/2017 | Paolini |
| 9,836,739 B1 | 12/2017 | Borovsky et al. |
| 9,881,305 B1 | 1/2018 | Lewis et al. |
| 9,965,760 B2* | 5/2018 | Leber .................... G06Q 20/40 |
| 10,417,635 B1 | 9/2019 | Aaron |
| 10,621,563 B1 | 4/2020 | Spindel et al. |
| 10,776,626 B1 | 9/2020 | Lin et al. |
| 10,783,509 B2 | 9/2020 | Pattarawuttiwong |
| 10,832,305 B1* | 11/2020 | Woodbeck ......... G06F 16/5866 |
| 11,080,674 B1 | 8/2021 | Chen et al. |
| 11,210,730 B1 | 12/2021 | Woodyard et al. |
| 11,244,382 B1 | 2/2022 | Woodyard et al. |
| 2003/0110507 A1 | 6/2003 | Dimitrova et al. |
| 2003/0204447 A1 | 10/2003 | Dalzell et al. |
| 2004/0133542 A1 | 7/2004 | Doerksen et al. |
| 2004/0138999 A1 | 7/2004 | Friedman et al. |
| 2005/0246245 A1 | 11/2005 | Satchell et al. |
| 2006/0131385 A1 | 6/2006 | Kim |
| 2006/0146839 A1 | 7/2006 | Hurwitz et al. |
| 2007/0143082 A1 | 6/2007 | Degnan |
| 2007/0150387 A1 | 6/2007 | Seubert et al. |
| 2007/0255653 A1 | 11/2007 | Tumminaro et al. |
| 2007/0255662 A1 | 11/2007 | Tumminaro |
| 2008/0052176 A1 | 2/2008 | Buchheit |
| 2008/0078831 A1 | 4/2008 | Johnson et al. |
| 2008/0177624 A9 | 7/2008 | Dohse |
| 2008/0197188 A1 | 8/2008 | Jagatic et al. |
| 2008/0270246 A1 | 10/2008 | Chen |
| 2009/0094126 A1 | 4/2009 | Killian et al. |
| 2009/0099961 A1 | 4/2009 | Ogilvy |
| 2009/0119190 A1 | 5/2009 | Realini |
| 2009/0266884 A1 | 10/2009 | Killian et al. |
| 2009/0271289 A1 | 10/2009 | Klinger et al. |
| 2009/0288012 A1 | 11/2009 | Hertel et al. |
| 2009/0319638 A1 | 12/2009 | Faith et al. |
| 2010/0010906 A1 | 1/2010 | Grecia |
| 2010/0217674 A1 | 8/2010 | Kean |
| 2010/0217699 A1 | 8/2010 | Bookstaff |
| 2010/0269059 A1 | 10/2010 | Othmer et al. |
| 2010/0306099 A1 | 12/2010 | Hirson et al. |
| 2011/0022965 A1* | 1/2011 | Lawrence ............... G06F 3/011 715/747 |
| 2011/0035319 A1 | 2/2011 | Brand et al. |
| 2011/0071892 A1 | 3/2011 | Dickelman |
| 2011/0082735 A1 | 4/2011 | Kannan et al. |
| 2011/0125633 A1 | 5/2011 | Aaltonen et al. |
| 2011/0145049 A1 | 6/2011 | Hertel et al. |
| 2011/0153438 A1 | 6/2011 | Dragt |
| 2011/0153464 A1 | 6/2011 | Hendricks et al. |
| 2011/0178883 A1 | 7/2011 | Granbery et al. |
| 2011/0180598 A1 | 7/2011 | Morgan et al. |
| 2011/0218871 A1 | 9/2011 | Singh |
| 2011/0246284 A1 | 10/2011 | Chaikin et al. |
| 2011/0251962 A1 | 10/2011 | Hruska |
| 2011/0276418 A1 | 11/2011 | Velani |
| 2011/0029416 A1 | 12/2011 | Greenspan |
| 2011/0313871 A1 | 12/2011 | Greenwood |
| 2012/0078731 A1 | 3/2012 | Linevsky et al. |
| 2012/0084210 A1 | 4/2012 | Farahmand |
| 2012/0166331 A1 | 6/2012 | Varsavsky Waisman-Diamond |
| 2012/0185355 A1 | 7/2012 | Kilroy |
| 2012/0011062 A1 | 8/2012 | Baker et al. |
| 2012/0197740 A1 | 8/2012 | Grigg et al. |
| 2012/0197743 A1 | 8/2012 | Grigg et al. |
| 2012/0197794 A1 | 8/2012 | Grigg et al. |
| 2012/0209749 A1 | 8/2012 | Hammad et al. |
| 2012/0214416 A1 | 8/2012 | Kent et al. |
| 2012/0143772 A1 | 10/2012 | Abadir |
| 2012/0150643 A1 | 10/2012 | Wolfe et al. |
| 2012/0253852 A1 | 10/2012 | Pourfallah et al. |
| 2012/0254031 A1 | 10/2012 | Walker et al. |
| 2012/0271707 A1 | 10/2012 | Harrison et al. |
| 2012/0166311 A1 | 11/2012 | Dwight et al. |
| 2012/0290447 A1* | 11/2012 | Hershenson ....... G06Q 30/0277 705/27.2 |
| 2012/0296726 A1 | 11/2012 | Dessert et al. |
| 2012/0303491 A1 | 11/2012 | Hill et al. |
| 2013/0019284 A1 | 1/2013 | Pacyga et al. |
| 2013/0041824 A1 | 2/2013 | Gupta |
| 2013/0054320 A1 | 2/2013 | Dorso et al. |
| 2013/0138563 A1 | 5/2013 | Gilder et al. |
| 2013/0144707 A1 | 6/2013 | Issacson et al. |
| 2013/0159081 A1 | 6/2013 | Shastry et al. |
| 2013/0159173 A1 | 6/2013 | Sivaraman et al. |
| 2013/0166402 A1 | 6/2013 | Parento et al. |
| 2013/0166445 A1 | 6/2013 | Issacson et al. |
| 2013/0173407 A1 | 7/2013 | Killian et al. |
| 2013/0181045 A1 | 7/2013 | Dessert et al. |
| 2013/0185152 A1 | 7/2013 | Aaron et al. |
| 2013/0204727 A1 | 8/2013 | Rothschild |
| 2013/0218697 A1 | 8/2013 | Kingston et al. |
| 2013/0218721 A1 | 8/2013 | Borhan et al. |
| 2013/0246203 A1 | 9/2013 | Laracey |
| 2013/0317835 A1 | 11/2013 | Mathew |
| 2013/0332354 A1 | 12/2013 | Rhee et al. |
| 2013/0339253 A1 | 12/2013 | Sincai |
| 2013/0346223 A1 | 12/2013 | Prabhu et al. |
| 2013/0346258 A1 | 12/2013 | Ali et al. |
| 2014/0006205 A1 | 1/2014 | Berry et al. |
| 2014/0012754 A1 | 1/2014 | Hanson et al. |
| 2014/0032297 A1 | 1/2014 | Germann et al. |
| 2014/0052617 A1 | 2/2014 | Chawla et al. |
| 2014/0067557 A1 | 3/2014 | van Niekerk et al. |
| 2014/0074569 A1 | 3/2014 | Francis et al. |
| 2014/0074658 A1 | 3/2014 | Sanchez |
| 2014/0074691 A1 | 3/2014 | Bank et al. |
| 2014/0081783 A1 | 3/2014 | Paranjape et al. |
| 2014/0081853 A1 | 3/2014 | Sanchez et al. |
| 2014/0089073 A1 | 3/2014 | Jacobs et al. |
| 2014/0089078 A1 | 3/2014 | Dessert et al. |
| 2014/0100973 A1 | 4/2014 | Brown et al. |
| 2014/0101737 A1 | 4/2014 | Rhee |
| 2014/0114775 A1 | 4/2014 | Cloin et al. |
| 2014/0100931 A1 | 5/2014 | Sanchez et al. |

(56) References Cited

U.S. PATENT DOCUMENTS

| | | |
|---|---|---|
| 2014/0129942 A1 | 7/2014 | Rathod |
| 2014/0136349 A1 | 7/2014 | Dave et al. |
| 2014/0188601 A1 | 7/2014 | Buset et al. |
| 2014/0201023 A1 | 7/2014 | Tang |
| 2014/0214652 A1 | 7/2014 | Zheng et al. |
| 2014/0156508 A1 | 9/2014 | Argue et al. |
| 2014/0156517 A1 | 9/2014 | Argue et al. |
| 2014/0164234 A1 | 9/2014 | Coffman et al. |
| 2014/0249947 A1 | 9/2014 | Hicks et al. |
| 2014/0250002 A1 | 9/2014 | Isaacson et al. |
| 2014/0279098 A1 | 9/2014 | Ham |
| 2014/0279197 A1 | 9/2014 | Ainsworth, III et al. |
| 2014/0201067 A1 | 12/2014 | Lai et al. |
| 2014/0363059 A1* | 12/2014 | Hurewitz .......... G06Q 30/0201 382/118 |
| 2014/0372300 A1 | 12/2014 | Blythe |
| 2015/0012426 A1 | 1/2015 | Purves et al. |
| 2015/0019341 A1 | 1/2015 | Pasila et al. |
| 2015/0032567 A1 | 1/2015 | Bhatia |
| 2015/0066765 A1 | 3/2015 | Banks et al. |
| 2015/0073907 A1 | 3/2015 | Purves et al. |
| 2015/0095228 A1 | 4/2015 | Su et al. |
| 2015/0100481 A1 | 4/2015 | Ghosh et al. |
| 2015/0106856 A1* | 4/2015 | Rankine ............. H04N 21/8456 725/60 |
| 2015/0120418 A1 | 4/2015 | Cervenka et al. |
| 2015/0134528 A1 | 5/2015 | Fineman et al. |
| 2015/0170245 A1* | 6/2015 | Scoglio ............. G06Q 30/0623 705/14.55 |
| 2015/0178755 A1 | 6/2015 | Olson et al. |
| 2015/0193829 A1* | 7/2015 | Mukherjee ............. G06T 11/60 705/14.67 |
| 2015/0194023 A1 | 7/2015 | Brackenridge et al. |
| 2015/0256888 A1* | 9/2015 | Livesey ............. H04N 21/8133 725/60 |
| 2015/0286724 A1 | 10/2015 | Knaapen et al. |
| 2016/0027059 A1 | 1/2016 | Lofthus |
| 2016/0086257 A1* | 3/2016 | Collins ............. G06Q 30/0641 705/27.1 |
| 2016/0012465 A1 | 8/2016 | Sharp |
| 2016/0232527 A1 | 8/2016 | Patterson |
| 2016/0328727 A1 | 11/2016 | Szulczewski et al. |
| 2016/0335688 A1* | 11/2016 | Wang .................... G06Q 20/363 |
| 2016/0335692 A1 | 11/2016 | Yamartino et al. |
| 2016/0350333 A1* | 12/2016 | Sacheti ................. G06F 16/248 |
| 2016/0367899 A1 | 12/2016 | Boncyk |
| 2016/0371546 A1 | 12/2016 | Yadav et al. |
| 2017/0032310 A1 | 2/2017 | Mimnaugh |
| 2017/0270498 A1* | 9/2017 | Maenpaa .......... G06Q 30/0226 |
| 2017/0270582 A1* | 9/2017 | Forss .................. G06V 10/764 |
| 2018/0039965 A1 | 2/2018 | Han et al. |
| 2018/0047192 A1 | 2/2018 | Kristal et al. |
| 2018/0182025 A1 | 6/2018 | Smith et al. |
| 2018/0268405 A1 | 9/2018 | Lopez |
| 2018/0276739 A1* | 9/2018 | Chopp ............... G06Q 30/0633 |
| 2019/0043039 A1 | 2/2019 | Wilson |
| 2019/0080277 A1 | 3/2019 | Trivelpiece et al. |
| 2019/0132715 A1 | 5/2019 | Marzouk |
| 2019/0236528 A1 | 8/2019 | Brooks et al. |
| 2019/0236531 A1 | 8/2019 | Adato et al. |
| 2019/0266654 A1 | 8/2019 | Gadre et al. |
| 2019/0306137 A1 | 10/2019 | Isaacson et al. |
| 2019/0325498 A1 | 10/2019 | Clark |

OTHER PUBLICATIONS

Final Office Action mailed Dec. 31, 2018, for U.S. Appl. No. 14/149,754, of Spindel, N., et al., filed Jan. 7, 2014.
Final Office Action mailed Feb. 12, 2019, for U.S. Appl. No. 14/526,337, of Wolter, A., filed Oct. 28, 2014.
Advisory Action mailed Mar. 29, 2019, for U.S. Appl. No. 14/149,754, of Spindel, N., et al., filed Jan. 7, 2014.
Advisory Action mailed Apr. 25, 2019, for U.S. Appl. No. 14/526,337, of Wolter, J.A., filed Oct. 28, 2014.
Final Office Action mailed May 2, 2019, for U.S. Appl. No. 15/900,433, of Rezayee, A., et al., filed Feb. 20, 2018.
Notice of Allowance mailed May 8, 2019, for U.S. Appl. No. 14/165,256, of Aaron, P., filed Jan. 27, 2014.
Non-Final Office Action mailed Jul. 11, 2019, for U.S. Appl. No. 14/149,754, of Spindel, N., et al., filed Jan. 7, 2014.
Non-Final Office Action mailed Aug. 14, 2019, for U.S. Appl. No. 15/830,059, of Borovsky, A., et al., filed Dec. 4, 2017.
Notice of Allowance mailed Oct. 18, 2019, for U.S. Appl. No. 14/208,800, of Thome, J.P., et al., filed Mar. 13, 2014.
Notice of Allowance mailed Dec. 12, 2019, for U.S. Appl. No. 14/149,754, of Spindel, N., et al., filed Jan. 7, 2014.
Notice of Allowance mailed Jan. 31, 2020, for U.S. Appl. No. 15/830,059, of Borovsky, A., et al., filed Dec. 4, 2017.
Non-Final Office Action mailed Feb. 6, 2020, for U.S. Appl. No. 15/900,433, of Rezayee, A., et al., filed Feb. 20, 2018.
Notice of Allowance mailed Feb. 20, 2020, for U.S. Appl. No. 14/208,800, of Thome, J.P., et al., filed Mar. 13, 2014.
Non-Final Office Action mailed Jun. 19, 2020, for U.S. Appl. No. 16/176,973, of Christopher W., et al., filed Oct. 31, 2018.
Non-Final Office Action mailed Aug. 4, 2020, for U.S. Appl. No. 16/177,020, of Rezayee, A., et al., filed Feb. 20, 2018.
Non-Final Office Action mailed Jul. 21, 2020, for U.S. Appl. No. 16/177,045, of Rezayee, A., et al., filed Feb. 20, 2018.
Non-Final Office Action mailed Nov. 3, 2020, for U.S. Appl. No. 16/204,556, of Matthew C., et al., filed Nov. 29, 2018.
Final Office Action mailed Dec. 8, 2020, for U.S. Appl. No. 16/176,973, of Christopher W., et al., filed Oct. 31, 2018.
Final Office Action mailed Jan. 15, 2021, for U.S. Appl. No. 16/177,045, of Rezayee, A., et al., filed Feb. 20, 2018.
Final Office Action mailed Feb. 1, 2021, for U.S. Appl. No. 16/177,020, of Rezayee, A., et al., filed Feb. 20, 2018.
Advisory Action mailed Feb. 16, 2021, for U.S. Appl. No. 16/176,973, of Christopher W., et al., filed Oct. 31, 2018.
Non-Final Office Action mailed Mar. 17, 2021, for U.S. Appl. No. 16/176,973, of Christopher W., et al., filed Oct. 31, 2018.
Advisory Action mailed Mar. 29, 2021, for U.S. Appl. No. 16/177,045, of Rezayee, A., et al., filed Feb. 20, 2018.
Final Office Action mailed Apr. 6, 2021, for U.S. Appl. No. 16/204,556, of Matthew C., et al., filed Nov. 29, 2018.
Non-Final Office Action mailed Jun. 9, 2021, for U.S. Appl. No. 16/177,045, of Rezayee, A., et al., filed Feb. 20, 2018.
Advisory Action mailed Jun. 22, 2021, for U.S. Appl. No. 16/204,556, of Matthew C., et al., filed Nov. 29, 2018.
Notice of Allowance mailed Jul. 8, 2021, for U.S. Appl. No. 16/177,020, of Rezayee, A., et al., filed Feb. 20, 2018.
Non-Final Office Action mailed Sep. 3, 2021, for U.S. Appl. No. 16/204,556, of Matthew C., et al., filed Nov. 29, 2018.
Corrected Notice of Allowability mailed Aug. 13, 2021, for U.S. Appl. No. 16/177,020, of Rezayee, A., et al., filed Feb. 20, 2018.
Final Office Action mailed Sep. 24, 2021, for U.S. Appl. No. 16/176,973, of Christopher W., et al., filed Oct. 31, 2018.
Notice of Allowance mailed Sep. 29, 2021, for U.S. Appl. No. 16/177,045, of Rezayee, A., et al., filed Feb. 20, 2018.
Corrected Notice of Allowability mailed Oct. 20, 2021, for U.S. Appl. No. 16/177,020, of Rezayee, A., et al., filed Feb. 20, 2018.
Advisory Action mailed Nov. 24, 2021, for U.S. Appl. No. 16/176,973, of Christopher W., et al., filed Oct. 31, 2018.
Corrected Notice of Allowability mailed Nov. 24, 2021, for U.S. Appl. No. 16/177,045, of Rezayee, A., et al., filed Feb. 20, 2018.
Corrected Notice of Allowability mailed Jan. 5, 2022, for U.S. Appl. No. 16/177,045, of Rezayee, A., et al., filed Feb. 20, 2018.
Final Office Action mailed Feb. 15, 2022, for U.S. Appl. No. 16/204,556, of Matthew C., et al., filed Nov. 29, 2018.
Advisory Action mailed Apr. 26, 2022, for U.S. Appl. No. 16/204,556, of Matthew C., et al., filed Nov. 29, 2018.
"Advancing Payment Security: MasterCard Contactless Security Overview," www.mastercard.com, retrieved from Internet URL: https://www.mastercard.com/contactless/doc/MasterCardContactless_SecurityFactSheet_2015.pdf, on Jun. 12, 2017, pp. 1-4.

(56) References Cited

OTHER PUBLICATIONS

Berger, S., et al., "Web services on mobile devices—Implementation and Experience," Computer Society, Proceedings of the Fifth IEEE Workshop on Mobile Computing Systems and Applications, pp. 1-10 (Oct. 2003 ).

Delic, N., et al., "Mobile Payment Solution—Symbiosis Between Banks, Application Service Providers and Mobile Network Operators," Computer Society, Proceedings of the Third International Conference on Information Technology: New Generations (ITNG'06), pp. 1-5 (Apr. 2006).

Munson, J., and Gupta, V.K., "Location-Based Notification as a General-Purpose Service," dated Sep. 28, 2002, Retrieved from the Internet URL—https://ai2-s2-pdfs.s3.amazonaws.com/1bb5/6ae0a70b030e2f2376ed246834bddcabd27b.pdf, pp. 40-44.

"Definition of Image", Merriam Webster, Retrived from the Internet URL: https://www.merriam-webster.com/dictionary/image, on Oct. 28, 2020, pp. 1-16.

Prakash P., "Square Inventory Items—Step by Step Guide" Retail-Bricks and Mortar, Ultimate Guide, (Jul. 16, 2017), pp. 1-12.

"Creating Items with Square Point of Sale" Square, Retrived from the Internet URL: https://www.youtube.com/watch?v=il2CPaPrUK4, Jun. 16, 2015, pp. 1-3.

Hossain, M., et al., "The Impact of Learning Style on Web Shopper Electronic Catalog Feature Preference", Retrieved from the Internet URL: Retrieved from https://www.proguest.com/scholarly-journals/impact-learning-style-on-web-shopper-electronic/docview/236658981/se-2?accountid=14753, Journal of Electronic Commerce Research, vol. 10, Issue 1, pp. 1-12 (2009).

Cho, H., & Fiorito, S. S., "Acceptance of online customization for apparel shopping", International Journal of Retail & Distribution Management, Retreived from Internet URL: doi:http://dx.doi.org/10.1108/09590550910954892, vol. 37 No. 5, (2009), pp. 389-407.

Non-Final Office Action mailed Oct. 15, 2018, for U.S. Appl. No. 15/900,433, of Rezayee, A., filed Feb. 20, 2018.

Non-Final Office Action mailed Aug. 27, 2014, for U.S. Appl. No. 14/165,256, of Aaron, P., filed Jan. 27, 2014.

Non-Final Office Action mailed Jan. 2, 2015, for U.S. Appl. No. 14/271,379, of Lewis, J., et al., filed May 6, 2014.

Final Office Action mailed Mar. 17, 2015, for U.S. Appl. No. 14/165,256, of Aaron, P., filed Jan. 27, 2014.

Non-Final Office Action mailed Apr. 27, 2015, for U.S. Appl. No. 14/184,503 of Borovsky, A., et al., filed Feb. 19, 2014.

Final Office Action mailed Jun. 26, 2015, for U.S. Appl. No. 14/271,379, of Lewis, J., et al., filed May 6, 2014.

Non-Final Office Action mailed Jul. 2, 2015, for U.S. Appl. No. 14/208,800, of Thome, J.P., et al., filed Mar. 13, 2014.

Final Office Action mailed Sep. 21, 2015, for U.S. Appl. No. 14/184,503, of Borovsky, A., et al., filed Feb. 19, 2014.

Non-Final Office Action mailed Sep. 30, 2015, for U.S. Appl. No. 14/189,880, of Aaron, P., et al., filed Feb. 25, 2014.

Non-Final Office Action mailed Oct. 8, 2015, for U.S. Appl. No. 14/149,754, of Spindel, N., et al., filed Jan. 7, 2014.

Non-Final Office Action mailed Oct. 8, 2015, for U.S. Appl. No. 14/165,256, of Aaron, P., filed Jan. 27, 2014.

Advisory Action mailed Dec. 4, 2015, for U.S. Appl. No. 14/184,503, of Borovsky, A., et al., filed Feb. 19, 2014.

Final Office Action mailed Dec. 31, 2015, for U.S. Appl. No. 14/208,800, of Thome, J.P., et al., filed Mar. 13, 2014.

Non-Final Office Action mailed Mar. 31, 2016, for U.S. Appl. No. 14/271,379, of Lewis, J., et al., filed May 6, 2014.

Final Office Action mailed Apr. 13, 2016, for U.S. Appl. No. 14/165,256, of Aaron, P., filed Jan. 27, 2014.

Final Office Action mailed Apr. 28, 2016, for U.S. Appl. No. 14/189,880, of Aaron, P., et al., filed Feb. 25, 2014.

Non-Final Office Action mailed Jun. 7, 2016, for U.S. Appl. No. 14/208,800, of Thome, J.P., et al., filed Mar. 13, 2014.

Non-Final Office Action mailed Jun. 17, 2016, for U.S. Appl. No. 14/184,503, of Borovsky, A., et al., filed Feb. 19, 2014.

Final Office Action mailed Jun. 17, 2016, for U.S. Appl. No. 14/149,754, of Spindel, N., et al., filed Jan. 7, 2014.

Advisory Action mailed Sep. 21, 2016, for U.S. Appl. No. 14/149,754, of Spindel, N., et al., filed Jan. 7, 2014.

Non-Final Office Action mailed Sep. 21, 2016, for U.S. Appl. No. 14/189,880, of Aaron, P., et al., filed Feb. 25, 2014.

Final Office Action mailed Oct. 6, 2016, for U.S. Appl. No. 14/271,379, of Lewis, J., et al., filed May 6, 2014.

Final Office Action mailed Nov. 30, 2016, for U.S. Appl. No. 14/208,800, of Thome, J.P., et al., filed Mar. 13, 2014.

Final Office Action mailed Dec. 27, 2016, for U.S. Appl. No. 14/184,503, of Borovsky, A., et al., filed Feb. 19, 2014.

Advisory Action mailed Dec. 29, 2016, for U.S. Appl. No. 14/271,379, of Lewis, J., et al., filed May 6, 2014.

Non-Final Office Action mailed Jan. 20, 2017, for U.S. Appl. No. 14/168,274, of Odawa, A.W., et al., filed Jan. 30, 2014.

Final Office Action mailed Mar. 2, 2017, for U.S. Appl. No. 14/189,880, of Aaron, P., et al., filed Feb. 25, 2014.

Advisory Action mailed Mar. 9, 2017, for U.S. Appl. No. 14/184,503, of Borovsky, A., et al., filed Feb. 19, 2014.

Non-Final Office Action mailed Apr. 21, 2017, for U.S. Appl. No. 14/149,754, of Spindel, N., et al., filed Jan. 7, 2014.

Final Office Action mailed May 19, 2017, for U.S. Appl. No. 14/168,274, of Odawa, A.W., et al., filed Jan. 30, 2014.

Notice of Allowance mailed Jul. 6, 2017, for U.S. Appl. No. 14/184,503, of Borovsky, A., et al., filed Feb. 19, 2014.

Non-Final Office Action mailed Aug. 4, 2017, for U.S. Appl. No. 14/526,337, of Wolter, J.A., filed Oct. 28, 2014.

Notice of Allowance mailed Sep. 18, 2017, for U.S. Appl. No. 14/271,379, of Lewis, J., et al., filed May 6, 2014.

Final Office Action mailed Dec. 1, 2017, for U.S. Appl. No. 14/149,754, of Spindel, N., et al., filed Jan. 7, 2014.

Non-Final Office Action mailed Dec. 29, 2017, for U.S. Appl. No. 14/165,256, of Aaron, P., filed Jan. 27, 2014.

Final Office Action mailed Mar. 14, 2018, for U.S. Appl. No. 14/526,337, of Wolter, J.A., filed Oct. 28, 2014.

Advisory Action mailed Mar. 16, 2018, for U.S. Appl. No. 14/149,754, of Spindel, N., et al., filed Jan. 7, 2014.

Non-Final Office Action mailed May 17, 2018, for U.S. Appl. No. 14/149,754, of Spindel, N., et al., filed Jan. 7, 2014.

Non-Final Office Action mailed Jul. 6, 2018, for U.S. Appl. No. 14/526,337, of Wolter, J.A., filed Oct. 28, 2014.

Final Office Action mailed Jul. 27, 2018, for U.S. Appl. No. 14/165,256, of Aaron, P., filed Jan. 27, 2014.

Advisory Action mailed Oct. 4, 2018, for U.S. Appl. No. 14/165,256, of Aaron, P., filed Jan. 27, 2014.

Final Office Action mailed Jun. 8, 2022, for U.S. Appl. No. 16/176,973, of Christopher W., et al., filed Oct. 31, 2018.

Non-Final Office Action mailed Feb. 9, 2022, for U.S. Appl. No. 16/176,973, of Christopher W., et al., filed Oct. 31, 2018.

Non-Final Office Action mailed Jul. 14, 2022, for U.S. Appl. No. 16/204,556, of Matthew C., et al., filed Nov. 29, 2018.

* cited by examiner

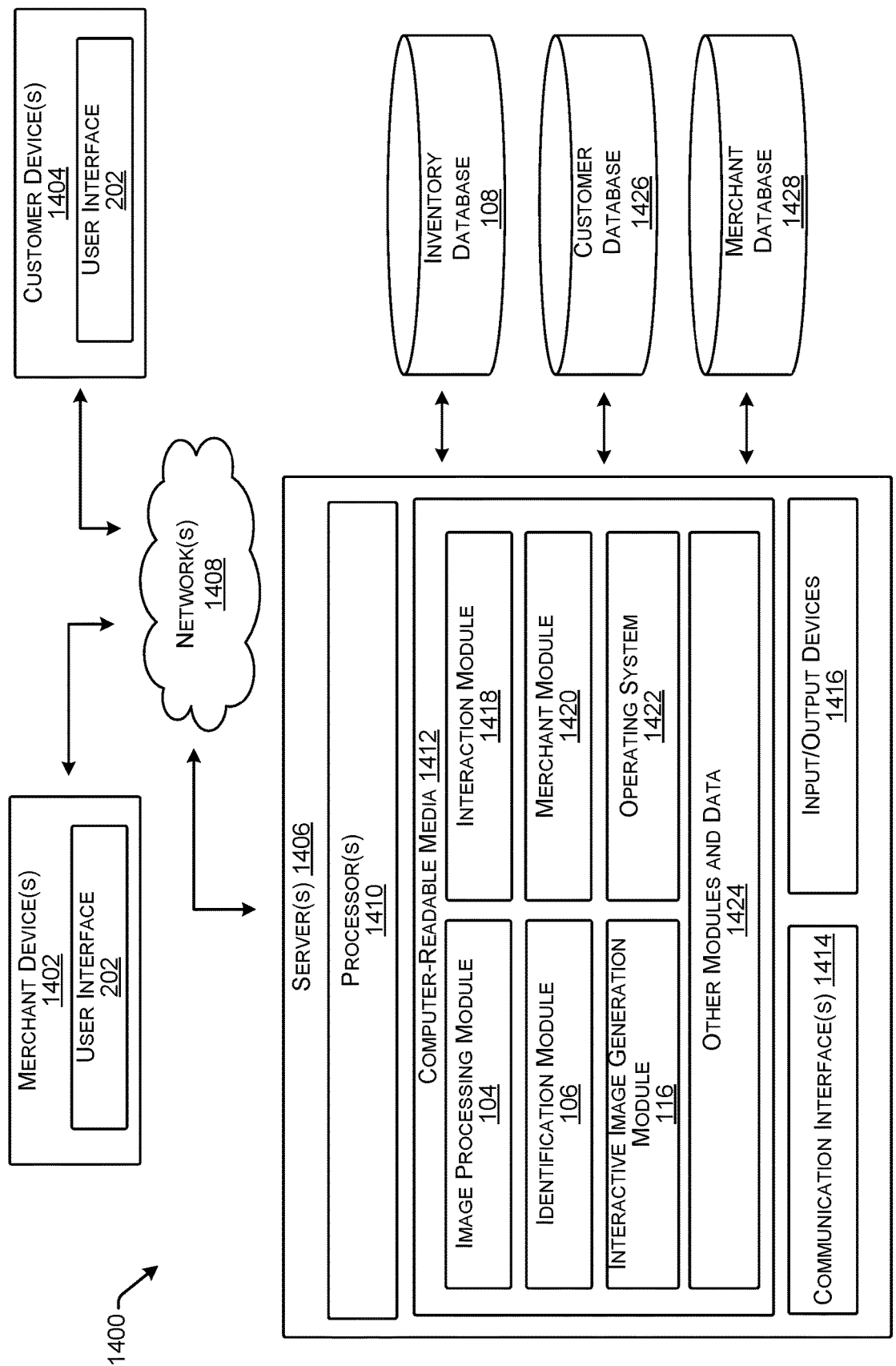

COMPUTER-IMPLEMENTED METHODS AND SYSTEM FOR CUSTOMIZED INTERACTIVE IMAGE COLLECTION BASED ON CUSTOMER DATA

RELATED APPLICATIONS

This application claims priority to U.S. patent application Ser. No. 16/177,020, filed Oct. 21, 2018, which is incorporated herein by reference.

BACKGROUND

Lookbooks are collections of images compiled to show off a model, photographer, style, stylist, clothing line, etc. In at least one example, lookbooks can be used by merchants to showcase their new products to customers. In some examples, lookbooks can be physical books (e.g., catalogs, etc.). In other examples, lookbooks can be digital (e.g., presented via online stores, blogs, etc.).

BRIEF DESCRIPTION OF THE DRAWINGS

Features of the present disclosure, its nature and various advantages, will be more apparent upon consideration of the following detailed description, taken in conjunction with the accompanying drawings.

FIG. 14 depicts an illustrative block diagram illustrating a system for performing techniques as described herein.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
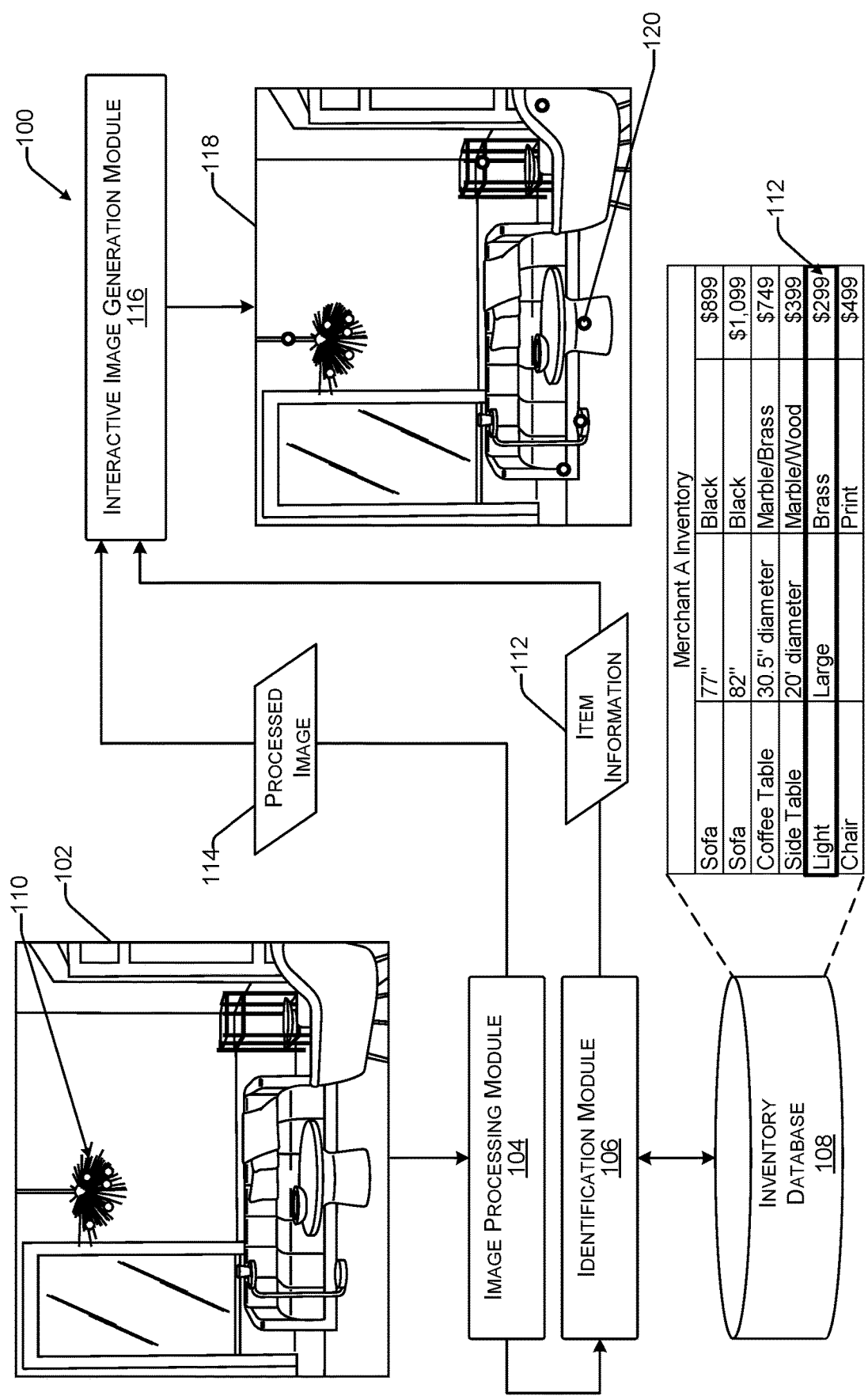
FIG. 1 illustrates an example environment for generating an interactive image based on inventory data, as described herein.

Techniques described herein are directed to generating interactive images based on inventory data, which allow customers to add items to a virtual cart via an integrated user interface. A merchant can provide an image that depicts a curated collection of items offered for sale by the merchant. An image processing system can analyze the image to identify individual items in the image. The items can be mapped to inventory data associated with inventory items offered for sale by the merchant (which is maintained by a payment processing service), and the inventory data can be used to determine item information associated with the items. Item information of an individual item can be associated with a selectable control that can be positioned such to overlay the item so as to create an interactive shoppable image. The image, now interactive, can be presented to a customer (e.g., via a device of the customer, a kiosk in a merchant store, a point-of-sale (POS) device of a merchant, etc.). When a customer interacts with the selectable control, item information can be presented to the customer and the customer can add at least the item to a virtual shopping cart without leaving the user interface that is presenting the image. As such, the interactive image is "shoppable" in that the customer can shop via interactions with the interactive image.

Techniques described herein are directed to automatically generating such interactive images and generating curated collections of interactive images that can be presented to customers. In some examples, interactive images in a curated collection of interactive images can be personalized for a customer, for instance, based on customer data. Further, in some examples, a curated collection of interactive images can be associated with multiple merchants. That is, in some examples, a customer can peruse a curated collection of interactive images associated with multiple merchants and add items offered for sale by the multiple distinct (i.e., unaffiliated or having no business relationship) merchants into a single virtual cart without leaving the user interface through which the customer can access the curated collection of interactive images and associated inventory items of the multiple merchants. A payment processing service can process payment for items in the virtual cart and can facilitate fulfillment of such items to the customer.

As described above, techniques described herein are directed to generating interactive images based on inventory data, which allow customers to add items to a virtual cart via an integrated user interface. Conventional online shopping utilizing interactive images typically require a customer to browse items via a first user interface (e.g., social media site), and when the customer desires to add an item to a virtual cart, the customer is required to access a second user interface generally associated with a second website (e.g., merchant site). That is, customers are required to navigate multiple user interfaces to facilitate a transaction. Techniques described herein are directed to unconventional online shopping approaches that enable a customer to interact with an interactive image to view item information and/or add one or more items depicted in the interactive image to a virtual cart without leaving the user interface that is presenting the interactive image. That is, techniques described herein offer an improved user interface that allows customers to more quickly access data stored in association with items presented via an interactive image (e.g., item information) for, in at least one example, generating a virtual cart (and ultimately processing a transaction). Such techniques offer improved user interaction with computing devices, and particularly for computing devices with small displays (e.g., mobile phones, tablets, etc.).

Furthermore, techniques described herein enable streamlined processes for generating interactive images. A payment processing service can be remotely positioned and accessible by various computing devices operable by merchants (e.g., merchant devices) and customers (e.g., customer devices). As a result, the payment processing service can be uniquely positioned to integrate stored inventory data with images (analyzed via image processing techniques) to generate interactive shoppable images. As described above, and will be described with more detail below, these shoppable images can have selectable controls positioned such to overlay on individual items in one or more images. A selectable control can be positioned to overlay an individual item such that when the selectable control is selected (e.g., actuated) by a customer, item information can be presented to the customer and/or the customer can add the item to a virtual cart via the same user interface so as to provide an improved navigation experience while also reducing network bandwidth caused by the multiple websites required by conventional shopping methods as describe above. The item information can be accessible via inventory data stored in association with the payment processing service, which can be used by the respective merchant for managing inventory of items offered for sale by the respective merchant. Such item information can be used to determine transaction data, which can be used for processing payment for the item. That is, the integrated system described herein enables automated (e.g., without human interaction) generation of interactive images that enable unconventional online shopping approaches, as described above.

Additional details pertaining to the above-mentioned techniques are described below with reference to FIGS. 1-14.

FIG. 1 illustrates an example environment 100 for generating an interactive image based on inventory data, as described herein. As illustrated in FIG. 1, a merchant can provide an image 102 to a payment processing service. The image 102 can depict one or more items. In some examples, the one or more items can be a curated collection of items, for instance wherein the item(s) are selected, organized, and/or presented based on professional, expert, or otherwise informed knowledge. In at least one example, the image 102 can be a still image (e.g., a digital images), a live image, a two-dimensional image, a three-dimensional image, etc.

The payment processing service can be associated with server computing device(s) storing one or more functional components that are executable by processors such as an image processing module 104, an identification module 106, and an inventory database 108. The payment processing service can receive transaction data and/or payment data associated with POS transactions between merchants and customers and can process payments on behalf of the merchants based on the transaction data and/or payment data. Actions attributed to the payment processing service can be performed by the server computing device(s), or functional components associated therewith, as described herein.

The image processing module 104 can utilize one or more algorithms to perform image processing on images (e.g., digital images). For instance, the image processing module 104 can perform segmentation, object detection and/or tracking (e.g., in live images), object recognition and/or tracking (e.g., in live images), object classification, object localization, etc. using various computer vision techniques. In some examples, the image processing module 104 can utilize classification algorithms including, but not limited to, Region-based Convolutional Neural Networks (CNN), Fast Region-based CNN, Faster Region-based CNN, Region-based Fully CNN, You Only Look Once (YOLO) models, Single-shot Detectors (SSD), Neural Architecture Search Net (NASNet), Mask Region-based CNN, Multibox, etc. While deep-learning algorithms are identified above, in alternative examples, other traditional algorithms can be used (e.g., feature extraction algorithms, selective search, etc.).

In some examples, algorithms used by the image processing module 104 can be trained (e.g., via a machine learning mechanism) based on images of items associated with inventory items of merchants associated with the payment processing service. For example, a merchant can associate an inventory item with one or more images (e.g., that can be used for selection via a merchant-facing user interface or a customer-facing user interface via a POS). Such images, or representations thereof, can be stored in the inventory database 108 associated with the payment processing service. In at least one example, such images can be analyzed using a machine learning mechanism to generate one or more algorithms that can be used for image processing.

In at least one example, the image processing module 104 can access the image 102 and can perform image processing on the image 102. The image processing module 104 can identify objects, which, for the purpose of this discussion can be items, in the image 102. For instance, the image processing module 104 can identify an item, such as a light 110, in the image 102. The image processing module 104 can output data indicative of items identified in the image 102. The identification module 106 can compare outputs of the image processing module 104 to inventory data stored in the inventory database 108 to determine whether identified items correspond to items in an inventory of a merchant. For the purpose of this discussion, an inventory can comprise items offered for acquisition (e.g., purchase, rent, borrowing, etc.) from a merchant.

The inventory database 108 can store data associated with items offered for acquisition by one or more merchants. In at least one example, the inventory database 108 can store a plurality of data items, where a data item of the plurality of data items represents an item that a merchant has available for acquisition. The data item can identify the item and can be associated with additional data that represents information about the item (e.g., "item information"). For instance, the item information can include a description of the item, a price of the item, a discount available for the item, taxes applicable to the item, a location of the item (e.g., where the item is located in a warehouse), image(s) of the item, characteristic(s) of the item, etc. In at least one example, characteristic(s) can be variants of the item and can be represented by characteristic values. A creator of an inventory can arbitrarily specify characteristic names and allowed values for each of the characteristics, dependent on the actual characteristics of an item. For instance, characteristic names can include "color" and "size" and characteristic values can include "red" or "green" or "small," "medium," or "large," for each characteristic name, respectively. In some examples, an inventory item can be associated with one or more images or other representations (e.g., that can be used for selection via a merchant-facing user interface or a customer-facing user interface at the POS).

FIG. 1 illustrates a non-limiting example of an inventory of a merchant that comprises data items representative of a sofa, coffee table, side table, light, chair, etc. As illustrated, each item is associated with a description, one or more characteristics, and a price. As described above, each data item can be associated with additional or alternative item information.

In at least one example, the identification module 106 can compare an item identified in the image 102 (e.g., the light 110) with the inventory database 108 to determine whether the item corresponds to an item in the inventory of the merchant. In at least one example, the inventory database 108 includes at least one image associated with each inventory item, as described above. Accordingly, the identification module 106 can compare the provided image 102 with a plurality of images stored in the inventory database 108 to determine if an inventory item corresponds with the item (e.g., the light 110) depicted in the provided image 102 (e.g., by comparing features, etc. to determine a similarity between the provided image and the images stored in the inventory database 108). In some examples, the identification module 106 can perform a lookup or another search of the inventory database 108 based on an item identified in the image 102 via the image processing module 104. For instance, the identification module 106 can analyze the inventory database 108 (e.g., via a lookup or other search) to determine whether the inventory of the merchant includes a data item associated with a light 110. Based on determining that the merchant inventory includes a data item associated with the identified item, the identification module 106 can access item information 112 associated with the identified item. That is, based on determining that the merchant inventory includes a data item associated with the light 110, the identification module 106 can access item information 112 associated with the light 110.

In at least one example, the image processing module 104 can send a processed image 114 to an interactive image generation module 116. The processed image 114 can include one or more indications of objects that have been identified and/or classified by the image processing module 104. In at least one example, the identification module 106 can send the item information 112 (or an indication of a location thereof) to the interactive image generation module 116.

The interactive image generation module 116 can be another functional component associated with server(s) of the payment processing service. The interactive image generation module 116 can generate an interactive image 118 based at least in part on overlaying selectable controls on individual items in an image. A selectable control 120 can be a user interface element (e.g., a shape, a graphic, a text, etc.) that can be actuated via interaction with a user interface. For instance, a customer can provide a touch input via a touch display to actuate (or "select") the selectable control 120. Or, a customer can click on the selectable control 120 using another input/output device (e.g., a mouse, etc.). The interactive image generation module 116 can associate selectable controls with individual items in the image 102, as described above. In at least one example, a selectable control 120 can be associated with item information (e.g., item information 112) associated with the item (e.g., the light 110) to which the selectable control corresponds.

In some examples, a selectable control can "overlay" an item in an image such to at least partially obstruct at least a portion of the item. In additional or alternative examples, a selectable control can be associated with an item in another manner, for instance, being positioned proximate to an item, within a threshold distance of an item, etc. In some examples, a selectable control may not be used at all and an alternate actuation mechanism can be associated with individual items in an image to enable access to item information and/or the addition of item(s) to a virtual cart.

In some examples, the interactive image generation module 116 can associate a selectable control with two or more items. That is, a single selectable control can be associated with two or more items. In an example, the image processing module 104 can analyze the image to identify two or more items that are proximate to one another in an image or are otherwise associated (e.g., bundled, etc.). The identification module 106 can identify item information associated with the two or more items and the item information for the two or more items can be associated with a single selectable control. The selectable control can be positioned such to overlay some or all of the two or more items. In some examples, depending on the proximity of the two or more items, the selectable control can be positioned within a threshold distance of each of the items or in another position such to indicate that the selectable control is associated with the two or more items. In such examples, the selectable control, upon actuation, can present item information associated with the two or more items and a customer can interact with a user interface to add all of the items, or individual of the items, to a virtual cart as described herein.

Figure 2:
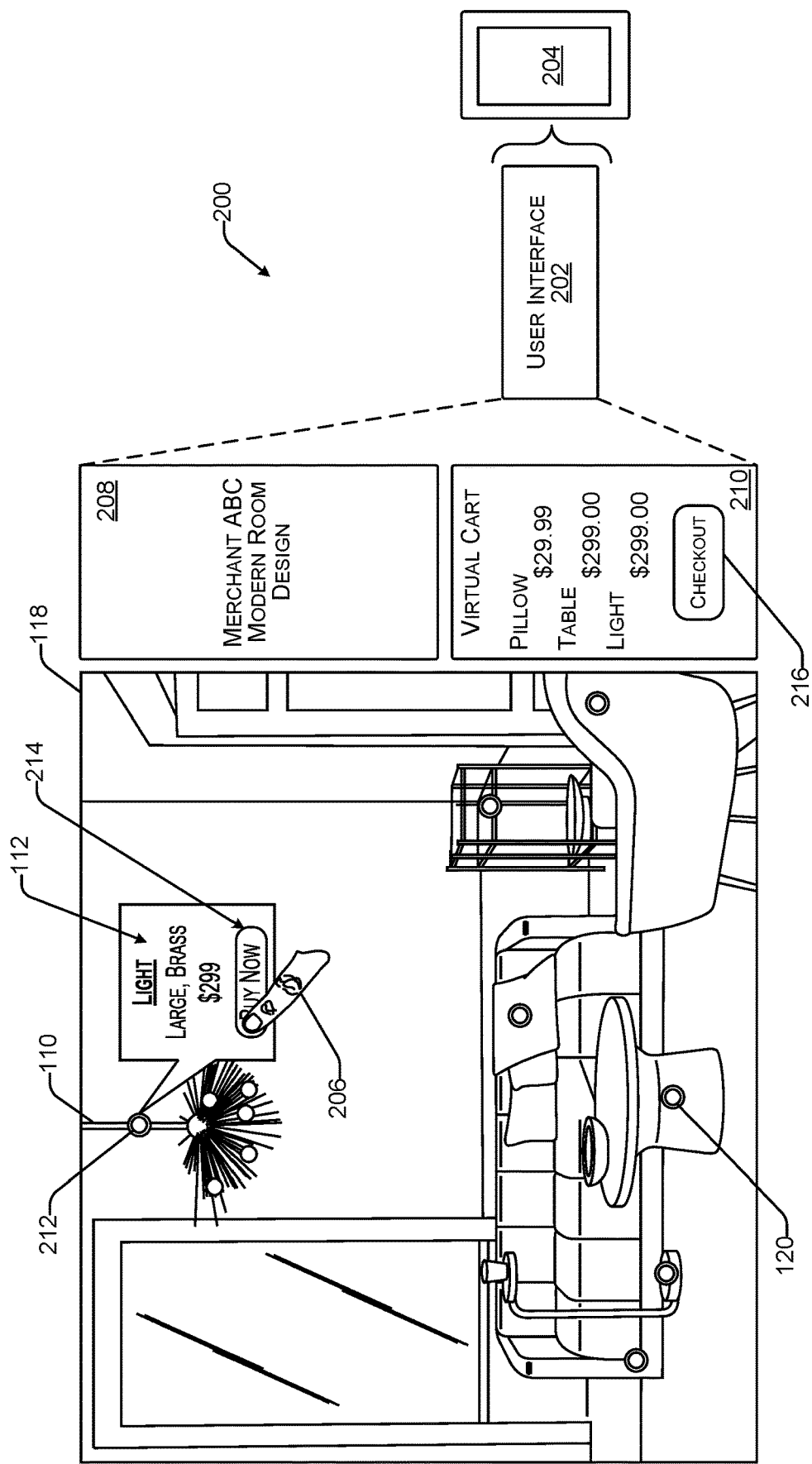
FIG. 2 illustrates an example environment for user interface for presenting an interactive image and/or generating a virtual cart from an interactive image, as described herein.

FIG. 2 illustrates an example environment 200 for presenting an interactive image and/or generating a virtual cart from an interactive image, as described herein. The interactive image 118 described above with reference to FIG. 1 is illustrated as being presented via a user interface 202. In at least one example, the user interface 202 can be presented via a web browser, or the like, via a display of a device 204 (e.g., a customer device, a merchant device, etc.). In some examples, the web browser can present a website associated with a particular merchant or group of merchants. In other examples, the web browser can present a website associated with a social media service or the like. In at least one example, the user interface 202 can be presented via an application, such as a mobile application or desktop application, which is provided by the payment processing service, or which can be an otherwise dedicated application (e.g., social media application, online shopping application of a merchant, etc.). In at least one example, the user interface 202 can present the interactive image 118. In some examples, the user interface 202 can additionally include information 208 associated with the merchant and/or the interactive image 118. Furthermore, in at least one example, the user interface 202 can include a visual representation of a virtual cart 210.

In at least one example, a customer 206 can interact with a selectable control 212 that is associated with an item (e.g., the light 110). In at least one example, an interaction with a selectable control, such as the selectable control 212, can enable the customer 206 to perform an action associated with the item (e.g., the light 110). Such an action can be viewing item information 112 associated with the item (e.g., the light 110), adding the item (e.g., the light 110) to a virtual cart 210, etc. In some examples, the item information 112 can be stored in association with the selectable control 212. In other examples, an access point (e.g., a link, etc.) to access the item information 112 can be stored in association with the selectable control 212. In such examples, the user interface 202 can interact with the server(s) of the payment processing service to access the item information 112 from the resource corresponding to the access point (e.g., the inventory database 108).

It should be noted that the selectable controls can be persistently visible in some examples. However, in additional or alternative examples, a selectable control can be hidden until it is determined that the customer 206 (or a representation thereof) is proximate the selectable control, at which time, the selectable control can be presented. That is, in such examples, the user interface 202 can refrain from presenting a selectable control until the customer 206 is determined to be within a threshold distance of the selectable control (or item associated therewith).

In some examples, the customer 206 can manipulate item information, for instance, by modifying a characteristic as presented. For instance, the customer 206 can select a different size or a different color than what is presented with the item information 112. In some examples, the user interface 202 can cause the associated item to change characteristic(s) based on selections of the customer 206 (e.g., as presented in the image). In at least one example, responsive to different variations of an item being selected by the customer 206, the user interface 202 can cause the item information presented to update, if necessary. For instance, if the customer 206 selects a variation of an item that is more expensive that what is currently presented as the item information 112, the user interface 202 can update the price to reflect the new price. In such examples, the user interface 202 can have access to at least a portion of the corresponding inventory data to facilitate the update. Additionally or alternatively, the user interface 202 can interact with the payment processing service to access remotely stored inventory data to update the item information 112.

In at least one example, the customer 206 can interact with another selectable control 214, which can be presented in association with the item information 112, to indicate a desire to purchase the item (e.g., the light 110). In some examples, the user interface 202 can send an indication to the payment processing service (e.g., server(s) associated therewith) indicating that the customer 206 desires to purchase the item (e.g., the light 110). As such, the payment processing service can add the item (e.g., the light 110) to the virtual cart and can send an indication to the user interface 202 to update the virtual cart 210. In other examples, the user interface 202 can add the item to the virtual cart 210 locally, without first sending an indication to the payment processing service.

The customer 206 can interact with the interactive image 118 to view item information 112 and/or add item(s) to the virtual cart 210 without leaving the user interface 202. That is, as described above, techniques described herein offer an improved user interface that allows customers to more quickly access data stored in association with items presented via an interactive image (e.g., item information) for, in at least one example, generating a virtual cart (and ultimately processing a transaction). Such techniques offer improved user interaction with computing devices, and particularly for computing devices with small displays (e.g., mobile phones, tablets, etc.).

When the customer 206 is ready to checkout (e.g., close out and complete the transaction), the customer 206 can interact with a selectable control 216 associated with the virtual cart 210 to indicate such intent. The user interface 202 can transmit an indication of such to the payment processing service and the payment processing service can process payment for the cost of the items in the virtual cart 210. That is, the payment processing service can obtain payment information associated with a payment instrument of the customer 206 and can process payment for the cost of the items in the virtual cart 210 using the payment information. Inventory data associated with item(s) added to the virtual cart 210 can be accessed and/or utilized for generating transaction data associated with the transaction (e.g., to process payment for the item(s) in the virtual cart 210). The payment processing service can also facilitate fulfillment of items in the virtual cart 210. Additional details associated with fulfillment are described below.

It should be noted that the contents of the virtual cart 210 are for illustrative purposes only and the virtual cart 210 can comprise any number of items.

Furthermore, it should be noted that while multiple items are depicted in the image 102, in some examples, images can have more or fewer items. In some examples, an image can have a single item. In other examples, an image can have a plurality of items, some of which may or may not be associated with selectable controls. In at least one example, a merchant can provide an image to the payment processing service, as described above with reference to FIG. 1. However, in an additional or alternative example, the payment processing service can provide the image to the payment processing service. In such examples, the item(s) in the payment processing service-provisioned image can be associated with the same or different merchants. Similarly, in some examples, multiple merchants can work on a collaboration wherein an image depicts items associated with the multiple merchants. That is, items in an image can be associated with one or more merchants.

Figure 3:
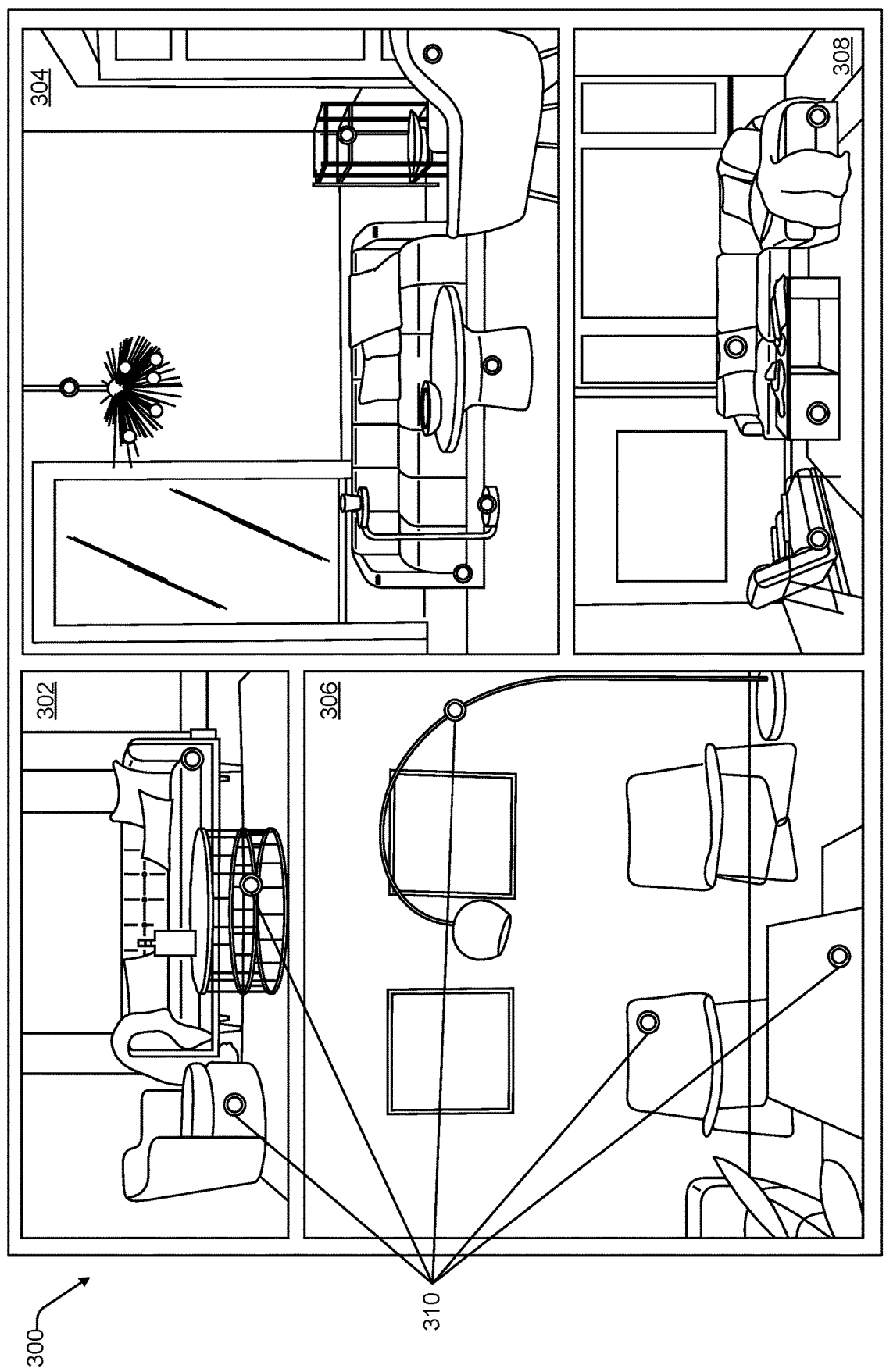
FIG. 3 illustrates an example of an image collection comprising multiple interactive images, as described herein.

FIG. 3 illustrates an example of an image collection 300 comprising multiple interactive images, as described herein. For the purpose of this discussion, such an image collection can be called a "lookbook." In at least one example, the image collection 300 can be presented via a user interface, such as the user interface 202 described above with reference to FIG. 2. In at least one example, the image collection 300 can comprise a collection of interactive images associated with a same merchant. For instance, images 302-308 can be associated with a same merchant. Image 304 can correspond to image 118 described above with reference to FIG. 1. Each of the images 302-308 can include one or more selectable controls 310.

In additional or alternative examples, the image collection 300 can comprise a collection of interactive images associated with different merchants. That is, any image of the images 302-308 can be associated with a different merchant than the other images. In examples where the collection of interactive images are associated with different merchants, a customer can interact with individual of the interactive images to build a virtual cart comprising items from different merchants. That is, in an example, a customer can interact via a single user interface to add items from multiple merchants to a virtual cart. The payment processing service can process payment for the virtual cart on behalf of the multiple, different merchants and can facilitate fulfillment of such items. Additional details associated with generating a collection of images associated with one or more merchants are described below. Similarly, additional details associated with processing a transaction and fulfillment of items associated with multiple merchants are described below.

For the purpose of this discussion, "different merchants" can refer to two or more unrelated merchants. "Different merchants" therefore can refer to two or more merchants that are different legal entities that do not share accounting, employees, branding, etc. "Different merchants," as used herein, have different names, EINs, lines of business (in some examples), inventories (or at least portions thereof) and/or the like. That is, the use of the term "different merchants" does not refer to a merchant with various merchant locations or franchise/franchisee relationships.

In some examples, the image collection 300 can be customized for a customer. For instance, in an example, customer data (e.g., purchase history, customer preferences, customer characteristics, etc.) can be used to determine an image collection 300 that is customized, at least partially, for the customer (and, in some examples, other like-customers). Additional details associated with generating a collection of images based on customer data are described below.

In at least one example, the interactive images of the image collection 300 can be presented as shown in FIG. 3. That is, individual interactive images can be organized in a tile configuration (or in another configuration) and a customer can scroll through the image collection 300 by navigating from top to bottom (or left to right) within the user interface 202. In additional or alternative examples, the individual interactive images can be arranged in an "e-book" format where one or more interactive images comprise a "page" in an "e-book" and a customer can flip through the "pages" to view different interactive images, without leaving the user interface 202. While four images 302-308 are illustrated in FIG. 3, an image collection can have any number of images. Additional or alternative configurations are within the scope of this disclosure and the configuration shown in FIG. 3 should not be construed as limiting.

In some examples, the payment processing service can present an image collection, such as image collection 300, via a common access point, such as a web browser, an application, etc. In some examples, the common access point can be accessible by a customer device of a customer, a merchant device of a merchants, etc. For instance, a customer can view an image collection via his/her personal computing device. Or, a customer and/or a merchant can view an image collection via a kiosk in a physical store of a merchant, a POS terminal of the merchant, etc. In additional or alternative examples, the payment processing service can send a personalized (or otherwise private) access point to a customer, such as an email, text message, push notification, etc. that includes a link or other means to access an image collection, such as image collection 300. Actuation of the link or other access means can cause an image collection, such as the image collection 300, to be presented to the customer.

FIGS. 4-13 are flowcharts showing example methods involving techniques as described herein. The methods illustrated in FIGS. 4-13 are described with reference to FIGS. 1-3, and FIG. 14 below, for convenience and ease of understanding. However, the methods illustrated in FIGS. 4-13 are not limited to being performed using components described in FIGS. 1-3 and FIG. 14, and such components are not limited to performing the methods illustrated in FIGS. 4-13.

The methods 400-1300 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 400-1300 can be combined in whole or in part with each other or with other methods.

Figure 4:
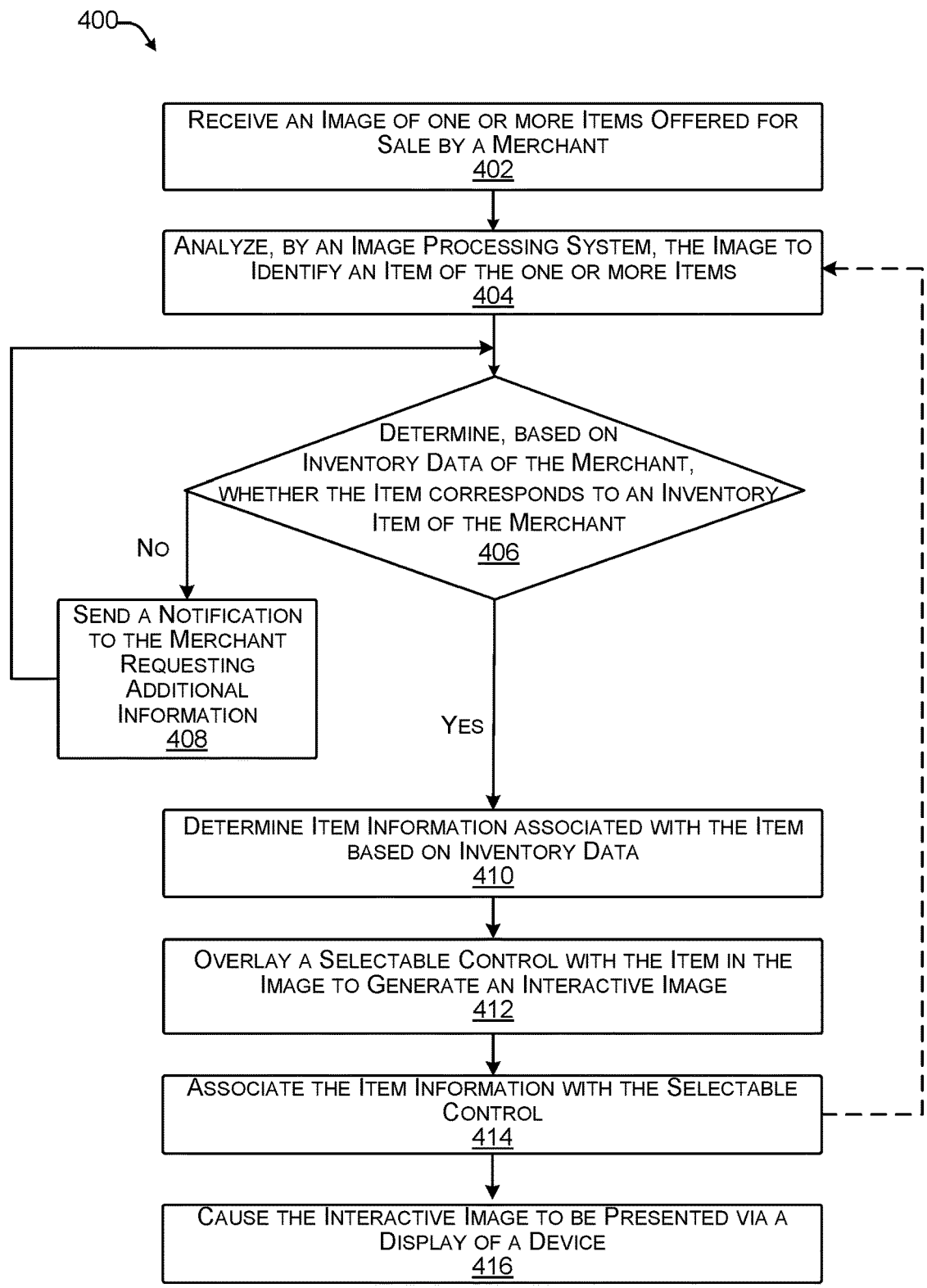
FIG. 4 illustrates an example process for generating an interactive image, as described herein.

FIG. 4 illustrates an example process 400 for generating an interactive image, as described herein.

Block 402 illustrates receiving an image of one or more items offered for sale by a merchant. As described above, a merchant can provide an image (e.g., image 102) to a payment processing service. In at least one example, a merchant device operable by a merchant can transmit an image to the payment processing service. The image can depict one or more items. In some examples, the one or more items can be a curated collection of items, in that the item(s) are selected, organized, and/or presented based on professional, expert, or otherwise informed knowledge. In at least one example, the image 102 can be a still image (e.g., a digital images), a live image, a two-dimensional image, a three-dimensional image, etc. In some examples, the image can be provided by the payment processing service, as described above.

Block 404 illustrates analyzing, by an image processing system, the image to identify an item of the one or more items. In at least one example, the image processing module 104 can access the image and can perform image processing on the image. As described above, the image processing module 104 can perform segmentation, object detection and/or tracking (e.g., in live images), object recognition and/or tracking (e.g., in live images), object classification, object localization, etc. using various computer vision techniques. The image processing module 104 can identify objects, which, for the purpose of this discussion can be items, in the image. The image processing module 104 can output data indicative of items identified in the image. Additionally, the image processing module 104 can output a processed image, wherein the processed image includes an indication of the item identified and/or classified by the image processing module 104.

Block 406 illustrates determining, based on inventory data of the merchant, whether the item corresponds to an inventory item of the merchant. As described above, the inventory database 108 can store data associated with items offered for acquisition by one or more merchants. In at least one example, the inventory database 108 can store a plurality of data items, where a data item of the plurality of data items represents an item that a merchant has available for acquisition. The data item can identify the item and can be associated with additional data that represents information about the item (e.g., "item information"). For instance, the item information can include a description of the item, a price of the item, a discount available for the item, taxes applicable to the item, a location of the item (e.g., where the item is located in a warehouse), image(s) of the item, characteristic(s) of the item, etc. In at least one example, characteristic(s) can be variants of the item and can be represented by characteristic values.

In at least one example, the identification module 106 can compare an item identified in the image provided by the merchant with the inventory database 108 to determine whether the item corresponds to an item in the inventory of the merchant. In at least one example, the inventory database 108 includes at least one image associated with each inventory item, as described above. Accordingly, the identification module 106 can compare the provided image with a plurality of images stored in the inventory database 108 to determine if an inventory item corresponds with an item depicted in the provided image (e.g., by comparing features, etc. to determine a similarity between the provided image and the images stored in the inventory database 108). In some examples, the identification module 106 can perform a lookup or another search of the inventory database 108 based on an item identified in the image via the image processing module 104. For instance, the identification module 106 can compare an identified with item names and/or descriptions in the inventory database 108 to determine whether the merchant inventory includes the identified item. Based on determining that the merchant inventory includes a data item associated with the identified item, the identification module 106 can access item information associated with the identified item.

If the identified item does not correspond to an item in the inventory data 108, the identification module 106 can send a notification to the merchant to request additional information, as illustrated in block 408. The notification may notify the merchant that the item was not identified in the inventory data and, in at least one example, can prompt the merchant to add the item to the merchant's inventory. If the merchant opts to add the item to the merchant's inventory, the identification module 106 can cause the item to be added to the merchant's inventory. In such an example, the identification module 106 can prompt the merchant to input item information at that time. The item information can be stored with the item in the inventory database 108.

In some examples, the identification module 106 can have misidentified or otherwise not identified the identified item in the inventory database 108 even though the item is in the inventory database 108. In such an example, the merchant can indicate which data item in the inventory database 108 corresponds to the identified item. In yet another example, the merchant can dismiss the notification, indicating that the identified item is not in the merchant's inventory. In at least one example, process 400 can proceed back to block 406 after presentation of such a notification to the merchant.

Block 410 illustrates determining item information associated with the item based on inventory data. Based on determining that the merchant inventory (e.g., in the inventory database 108) includes a data item associated with the identified item, the identification module 106 can access item information associated with the identified item. In at least one example, the identification module 106 can send the item information (or an indication of a location thereof) to the interactive image generation module 116.

Block 412 illustrates overlaying a selectable control with the item in the image to generate an interactive image. As described above, in at least one example, the image processing module 104 can send a processed image to an interactive image generation module 116 and the identification module 106 can send the item information (or an indication of a location thereof) to the interactive image generation module 116. The interactive image generation module 116 can identify, in the processed image, the item to which the item information corresponds and can associate a selectable control with the item. That is, the interactive image generation module 116 can overlay a selectable control on the image. As described above, a selectable control can be a user interface element (e.g., a shape, a graphic, a text, etc.) that can be actuated via interaction with a user interface.

In some examples, a selectable control can "overlay" an item in an image such to at least partially obstruct at least a portion of the item. In additional or alternative examples, a selectable control can be associated with an item in another manner, for instance, being positioned proximate to an item, within a threshold distance of an item, etc. In some examples, a selectable control may not be used at all and an alternate actuation mechanism can be associated with individual items in an image to enable access to item information and/or the addition of item(s) to a virtual cart.

Block 414 illustrates associating the item information with the selectable control. The interactive image generation module 116 can associate the item information with the selectable control. In at least one example, the item information can be stored in association with the selectable control such that upon activation, the user interface 202 can cause the item information to be presented via the user interface 202 (without first interacting with the server(s) of the payment processing service). In other examples, an access point to access the item information can be stored in association with the selectable control. In such examples, the user interface 202 can interact with the server(s) of the payment processing service to access the item information from the resource corresponding to the access point (e.g., the inventory database 108).

Process 400 can repeat blocks 404-414 for each item in the image. That is, the interactive image generation module 116 can associate selectable controls with individual items in the image, each selectable control enabling a customer to perform an action in association with the item with which the selectable control corresponds. As described above, in some examples, a single selectable control can be associated with two or more items, and corresponding item information.

Block 416 illustrates causing the interactive image to be presented via a display of a device. In at least one example, the interactive image generation module 116 can cause the interactive image to be presented via a display of a device. In an example, the interactive image can be output via the user interface 202, which can be presented via a web browser, or the like, via a display of a device 204 (e.g., a customer device, a merchant device, etc.). In other examples, the user interface 202 can be presented via an application, such as a mobile application or desktop application, which is provided by the payment processing service, or which can be an otherwise dedicated application.

In some examples, the payment processing service can present the interactive image, via a common access point, such as a web browser, an application, etc. In additional or alternative examples, the payment processing service can send a personalized (or otherwise private) access point to a customer, such as an email, text message, push notification, etc. that includes a link or other means to access the interactive image. Actuation of the link or other access means can cause the interactive image to be presented to the customer.

As described below with reference to FIG. 5, in some examples, an interactive image can be combined with other interactive images (from the same or different merchants) into an image collection.

Figure 5:
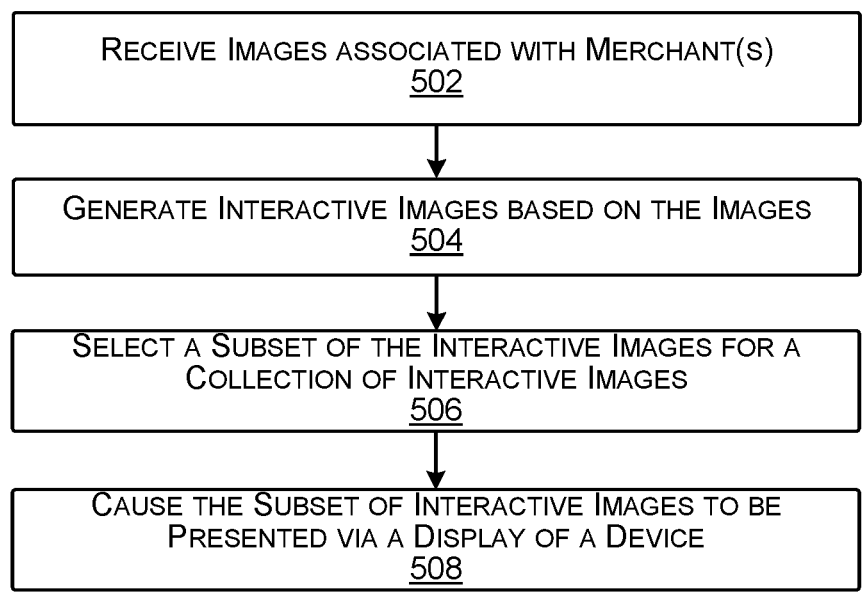
FIG. 5 illustrates an example process for generating an image collection, as described herein.

FIG. 5 illustrates an example process 500 for generating an image collection, as described herein.

Block 502 illustrates receiving images associated with merchant(s). As described above, a merchant can provide an image to a payment processing service. In some examples, a merchant can provide multiple images to a payment processing service. Similarly, multiple merchants can provide images to a payment processing service, via respective merchant devices. In some examples, as described above, the payment processing service can supply an image depicting one or more items associated with one or more merchants.

Block 504 illustrates generating interactive images based on the images. The interactive image generation module 116 can generate interactive images based on each of the images as described above with reference to FIG. 4.

Block 506 illustrates selecting a subset of the interactive images for a collection of interactive images. In at least one example, the interactive image generation module 116 can select a subset of interactive images for a collection of images. In some examples, the interactive image generation module 116 can select the subset based on the interactive images in the subset being associated with the same or similar merchants, same or similar item(s), a same or similar type of item, items known to be bundled, a marketing plan, etc. In additional or alternative examples, the interactive image generation module 116 can select the subset based on customer data of a customer. That is, in some examples, the interactive image generation module 116 can generate image collections that are personalized for a customer. Additional details are described below.

Block 508 illustrates causing the subset of interactive images to be presented via a display of a device. As described above, in at least one example, the interactive image generation module 116 can cause interactive images to be presented via a display of a device. In an example, interactive images can be output via the user interface 202, which can be presented via a web browser, or the like, via a display of a device 204 (e.g., a customer device, a merchant device, etc.). In other examples, the user interface 202 can be presented via an application, such as a mobile application or desktop application, which is provided by the payment processing service, or which can be an otherwise dedicated application.

In some examples, the payment processing service can present the interactive images, via a common access point, such as a web browser, an application, etc. In additional or alternative examples, the payment processing service can send a personalized (or otherwise private) access point to a customer, such as an email, text message, push notification, etc. that includes a link or other means to access the interactive images. Actuation of the link or other access means can cause the interactive images to be presented to the customer.

In at least one example, the interactive images of an image collection can be presented as shown in FIG. 3. That is, individual interactive images can be organized in a tile configuration (or in another configuration) and a customer can scroll through the image collection. In additional or alternative examples, the individual interactive images can be arranged in an "e-book" format where one or more interactive images comprise a "page" in an "e-book" and a customer can flip through the "pages" to view different interactive images. As noted above with reference to FIG. 3, additional or alternative configurations are within the scope of this disclosure and the configuration shown in FIG. 3 should not be construed as limiting.

Figure 6:
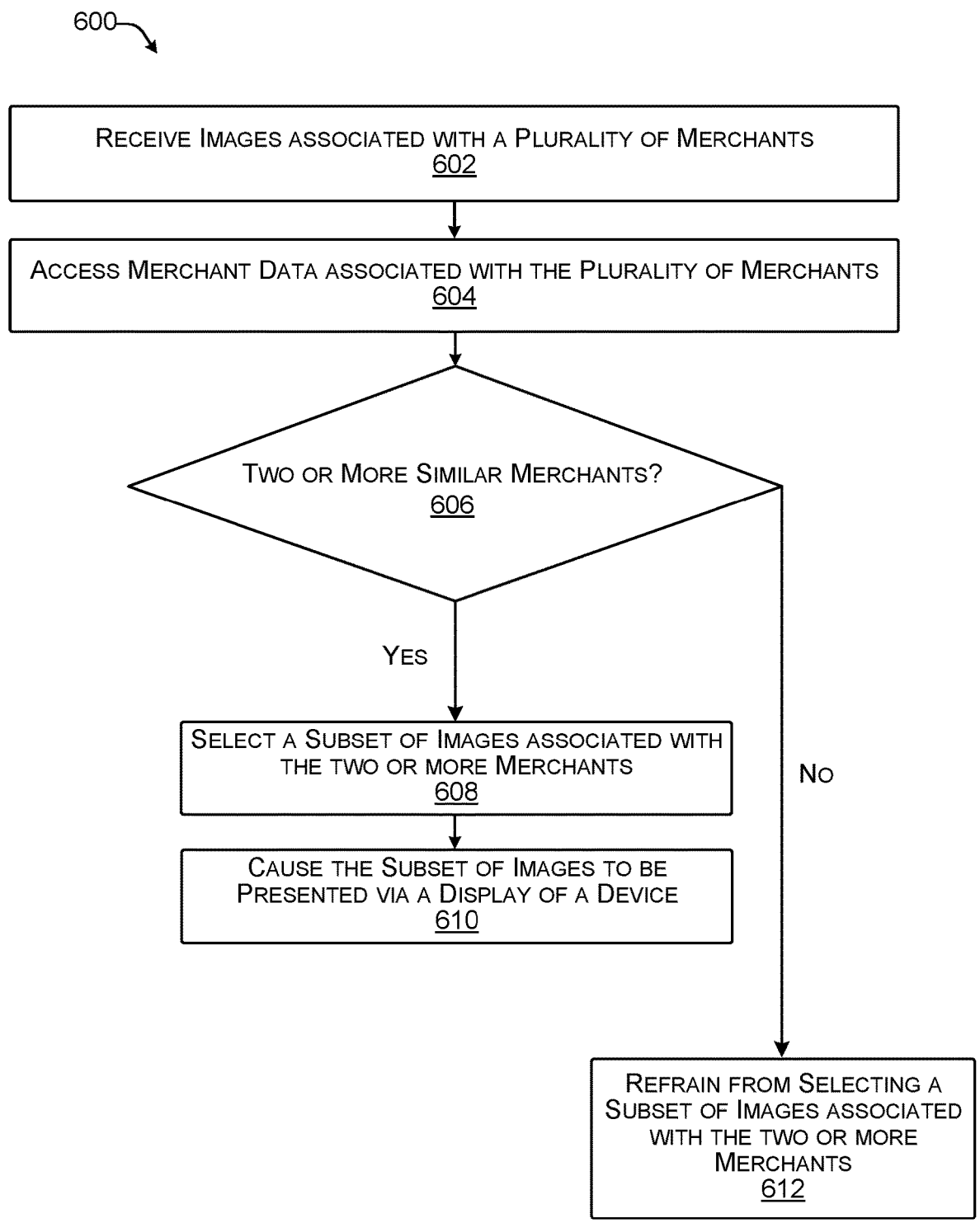
FIG. 6 illustrates an example process for generating an image collection based on a similarity between two or more merchants, as described herein.

FIG. 6 illustrates an example process 600 for generating an image collection based on a similarity between two or more merchants, as described herein.

Block 602 illustrates receiving images associated with a plurality of merchants. As described above, a merchant can provide an image to a payment processing service. In some examples, a merchant can provide multiple images to a payment processing service. Similarly, multiple merchants can provide images to a payment processing service, via respective merchant devices. In some examples, as described above, the payment processing service can supply an image depicting one or more items associated with one or more merchants.

Block 604 illustrates accessing merchant data associated with the plurality of merchants. In at least one example, the payment processing service (e.g., server(s) associated therewith) can store merchant profiles associated with merchants that utilize payment processing services of the payment processing service (e.g., in a merchant database). A merchant profile can include merchant data associated with a merchant including, but not limited to, a merchant category classification (MCC), item(s) offered for sale by the merchant, transaction data associated with transactions conducted by the merchant (e.g., POS applications), bank information associated hardware (e.g., device type) used by the merchant, geolocations of physical stores of the merchant, previous loans made to the merchant, previous defaults on said loans, an indication of risk (e.g., based at least in part on fraud, chargeback, etc.) associated with the merchant, etc. In at least one example, a merchant profile can be mapped to, or otherwise associated with, a portion of the inventory database 108 associated with the merchant's inventory. A merchant profile can store additional or alternative types of merchant data.

In at least one example, the interactive image generation module 116 can access merchant profiles associated with the plurality of merchants.

Block 606 illustrates determining whether two or more merchants of the plurality of merchants are similar. In at least one example, the interactive image generation module 116 can analyze merchant data, for instance, using a machine-trained model, statistical analysis, etc. to determine a similarity metric representative of the similarity between two or more merchants. In at least one example, the interactive image generation module 116 can compare similarity metrics associated with multiples of merchants to determine whether the merchants are similar. If a similarity metric meets or exceeds a threshold, the interactive image generation module 116 can determine that merchants corresponding to the similarity metric are similar.

In at least one example, the machine-trained model can be trained via a machine learning mechanism. In such an example, the model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model can be trained on training data associated with a plurality of merchants. The training data can include merchant data and indications of similarities (e.g., similarity metrics) between merchants. As a result, the machine-trained model can output a similarity metric indicating a similarity between two merchants, which can be based on merchant data associated with the two merchants.

In some examples, the similarity metric can represent that two or more merchants share one or more characteristics, such as the same and/or similar item(s) offered for sale, the same and/or similar geolocation, the same and/or similar MCC, the same and/or similar price point, etc. As a non-limiting example, two merchants that sell furniture in a same geolocation can be associated with a similarity metric that meets or exceeds a threshold. However, a merchant that sells boats and a merchant that sells shoes can be associated with a similarity metric that does not meet the threshold.

Block 608 illustrates selecting a subset of images associated with the two or more merchants. In at least one example, the interactive image generation module 116 can select two or more images associated with two or more merchants that are determined to be similar. In some examples, the interactive image generation module 116 can select two or more images that are associated with the most similar merchants (e.g., variation between similarity metrics is smaller than the variation between similarity metrics of other merchants, highest similarity metrics, etc.), a number of merchants with similarity metrics above a threshold, etc.

Block 610 illustrates causing the subset of images to be presented via a display of a device. As described above, in at least one example, the interactive image generation module 116 can cause interactive images to be presented via a display of a device. In an example, interactive images can be output via the user interface 202, which can be presented via a web browser, or the like, via a display of a device 204 (e.g., a customer device, a merchant device, etc.). In other examples, the user interface 202 can be presented via an application, such as a mobile application or desktop application, which is provided by the payment processing service, or which can be an otherwise dedicated application.

In some examples, the payment processing service can present the interactive images, via a common access point, such as a web browser, an application, etc. In additional or alternative examples, the payment processing service can send a personalized (or otherwise private) access point to a customer, such as an email, text message, push notification, etc. that includes a link or other means to access the interactive images. Actuation of the link or other access means can cause the interactive images to be presented to the customer.

If two or more merchants are not determined to be similar in block 606, the interactive image generation module 116 can refrain from selecting a subset of images, as illustrated in block 612.

While FIG. 6 is directed to selecting a subset of images based on similar merchants, in an alternative example, the interactive image generation module 116 can select two or more images associated with two or more merchants that are determined to be dissimilar (e.g., to promote diverse merchants). In such examples, the interactive image generation module 116 can select such images based on two or more merchants with a similarity metric that is below a threshold, lowest similarity metrics, etc. In yet other examples, the interactive image generation module 116 can select two or more images associated with two or more merchants that are determined to be neither similar nor dissimilar, randomly, etc. In at least one example, a merchant or other entity can self-select interactive images to comprise the subset of interactive images.

Figure 7:
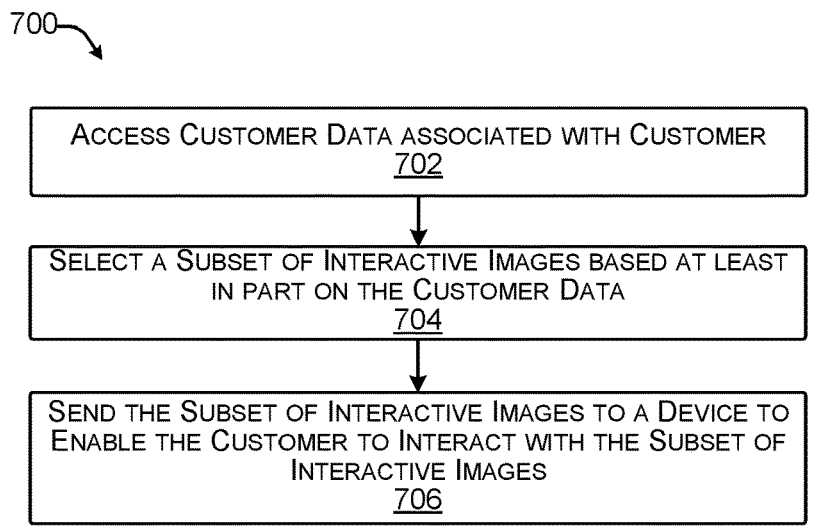
FIG. 7 illustrates an example process for personalizing an image collection based on customer data, as described herein.

FIG. 7 illustrates an example process 700 for personalizing an image collection based on customer data, as described herein.

Block 702 illustrates accessing customer data associated with a customer. In at least one example, the payment processing service can store customer profiles associated with customers (e.g., of merchants that utilize the payment processing service), for instance in a customer database. A customer profile can be associated with customer data ("characteristics") (e.g., name, phone number, address, banking information, etc.), customer preferences (e.g., learned or customer-specified), purchase history data (e.g., identifying one or more items purchased (and respective item information), payment instruments used to purchase the one or more items, returns associated with one or more orders, statuses of one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), customer service data, etc. Additional or alternative customer data can be stored in the customer profiles. In at least one example, the interactive image generation module 116 can access customer data associated with a customer.

Block 704 illustrates selecting a subset of interactive images based at least in part on the customer data. In at least one example, the interactive image generation module 116 can select a subset of interactive images based at least in part on the customer data. In some examples, the interactive image generation module 116 can select the subset of interactive images based on a purchase history of the customer. For instance, if a customer previously purchased an item from a merchant, the interactive image generation module 116 can select interactive images that depict the item or a variation thereof. Further, if a customer previously purchased an item from a merchant, the interactive image generation module 116 can select interactive images that depict one or more items that correspond to or are bundled with the item. For instance, in at least one example, such items can be items that are frequently purchased together or near in time or items that are indicated as corresponding to or bundled with the item. As a non-limiting example, if the purchase history indicates that a customer likes independent designers (e.g., the customer has purchased items from various independent designers), the interactive image generation module 116 can select interactive images that are associated with independent designers.

Customer preferences and/or characteristics can also influence which interactive images are selected for the subset of interactive images. For instance, in a non-limiting example, if customer preferences of a customer indicate that the customer prefers neutral colored clothing (instead of bright colors and/or prints), the image generation module 116 can select interactive images that are associated with neutral colored clothing. Or, if a customer is determined to live in Florida, the image generation module 116 can omit interactive images that are associated with winter apparel and outdoor gear (and select interactive images associated with bathing suits and beachwear).

As described above, the subset of interactive images can be associated with the same merchant or different merchants.

Block 706 illustrates sending the subset of interactive images to a device to enable the customer to interact with the subset of interactive images. As described above, in at least one example, the interactive image generation module 116 can cause interactive images to be presented via a display of a device. In an example, interactive images can be output via the user interface 202, which can be presented via a web browser, or the like, via a display of a device 204 (e.g., a customer device, a merchant device, etc.). In other examples, the user interface 202 can be presented via an application, such as a mobile application or desktop application, which is provided by the payment processing service, or which can be an otherwise dedicated application.

In an example where an image collection is particular to a customer, the payment processing service can send a personalized (or otherwise private) access point to the customer (e.g., a customer device associated therewith), such as an email, text message, push notification, etc. that includes a link or other means to access the image collection. Actuation of the link or other access means can cause the interactive images of the image collection to be presented to the customer. In some examples, the payment processing service can access a customer identifier from the customer data, which can identify a phone number, email address, account, etc. The payment processing service can send the personalized access point to the customer using the customer identifier.

In some examples, the interactive image generation module 116 can generate a customized image collection responsive to receiving a request for an image collection. For instance, in at least one example, a customer can interact with a customer device to request an image collection. In such an example, the customer device can send a request to the payment processing service. Such a request can be associated with a customer identifier, such as an account log-in, a phone number, an email address, etc. In some examples, the interactive mage generation module 116 can utilize the customer identifier associated with the request to access the customer data, as described above with reference to block 702.

Figure 8:
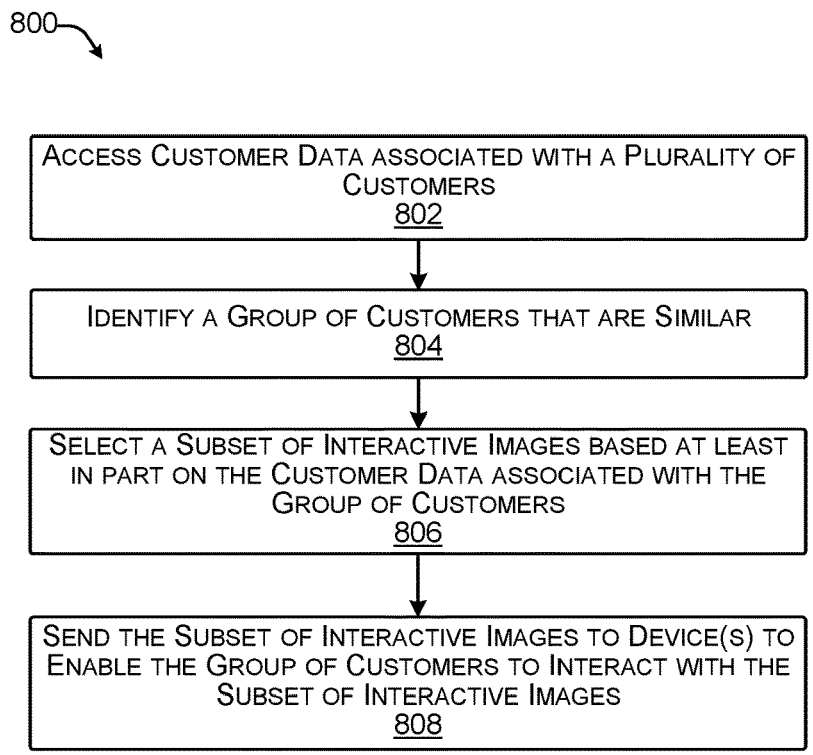
FIG. 8 illustrates an example process for personalizing an image collection based on customer data associated with a group of similar customers, as described herein.

FIG. 8 illustrates an example process 800 for personalizing an image collection based on customer data associated with a group of similar customers, as described herein.

Block 802 illustrates accessing customer data associated with a plurality of customers. In at least one example, the payment processing service can store customer profiles associated with customers (e.g., of merchants that utilize the payment processing service). A customer profile can be associated with customer data, as described above. In at least one example, the interactive image generation module 116 can access customer data associated with a plurality of customers.

Block 804 illustrates identifying a group of customers that are similar. In at least one example, the interactive image generation module 116 can analyze customer data, for instance, using a machine-trained model, statistical analysis, etc. to determine a similarity metric representative of the similarity between two or more customers. In at least one example, the interactive image generation module 116 can compare similarity metrics associated with multiples of customers to determine whether the customers are similar. If a similarity metric meets or exceeds a threshold, the interactive image generation module 116 can determine that customers corresponding to the similarity metric are similar.

In at least one example, the machine-trained model can be trained via a machine learning mechanism. In such an example, the model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model can be trained on training data associated with a plurality of customers. The training data can include customer data and indications of similarities (e.g., similarity metrics) between customers. As a result, the machine-trained model can output a similarity metric indicating a similarity between two customers, which can be based on customer data associated with the two customers.

In some examples, the similarity metric can represent that two or more customers share one or more characteristics, such as a same and/or similar purchase history, the same and/or similar preferences, the same and/or similar geolocation, etc. As a non-limiting example, two customers that frequent high-end coffee shops in a same geolocation can be associated with a similarity metric that meets or exceeds a threshold. However, a customer that prefers to shop at box stores and a customer that prefers to shop at boutiques can be associated with a similarity metric that does not meet the threshold.

Block 806 illustrates selecting a subset of interactive images based at least in part on the customer data associated with the group of customers. In at least one example, the interactive image generation module 116 can select a subset of interactive images based at least in part on the customer data (associated with the group of customers). In some examples, the interactive image generation module 116 can select the subset of interactive images based on purchase histories of the group of customers. Preferences shared by the group of customers and/or characteristics of the group of customers can also influence which interactive images are selected for the subset of interactive images. As described above, the subset of interactive images can be associated with the same merchant or different merchants.

Block 808 illustrates sending the subset of interactive images to a device to enable the customer to interact with the subset of interactive images. As described above, in at least one example, the interactive image generation module 116 can cause interactive images to be presented via a display of a device. In an example, interactive images can be output via the user interface 202, which can be presented via a web browser, or the like, via a display of a device 204 (e.g., a customer device, a merchant device, etc.). In other examples, the user interface 202 can be presented via an application, such as a mobile application or desktop application, which is provided by the payment processing service, or which can be an otherwise dedicated application.

In an example where an image collection is particular to a customer, the payment processing service can send a personalized (or otherwise private) access point to the customer (e.g., a customer device associated therewith), such as an email, text message, push notification, etc. that includes a link or other means to access the image collection. Actuation of the link or other access means can cause the interactive images of the image collection to be presented to the customer. In some examples, the payment processing service can access a customer identifier from the customer data, which can identify a phone number, email address, account, etc. The payment processing service can send the personalized access point to the customer using the customer identifier. In the example described in FIG. 8, the payment processing service can send a personal link, or otherwise provide a personalized access point to each customer in the group of customers, and the customers can access the subset of interactive images based on an interaction with the link or other personalized access point.

In some examples, the interactive image generation module 116 can generate image collections based on customer data, as described above with reference to FIGS. 7 and 8. In additional or alternative examples, the interactive image generation module 116 can generate image collections without regard to customer data and can select which image collection of the image collections to send to particular customers based on customer data.

Figure 9:
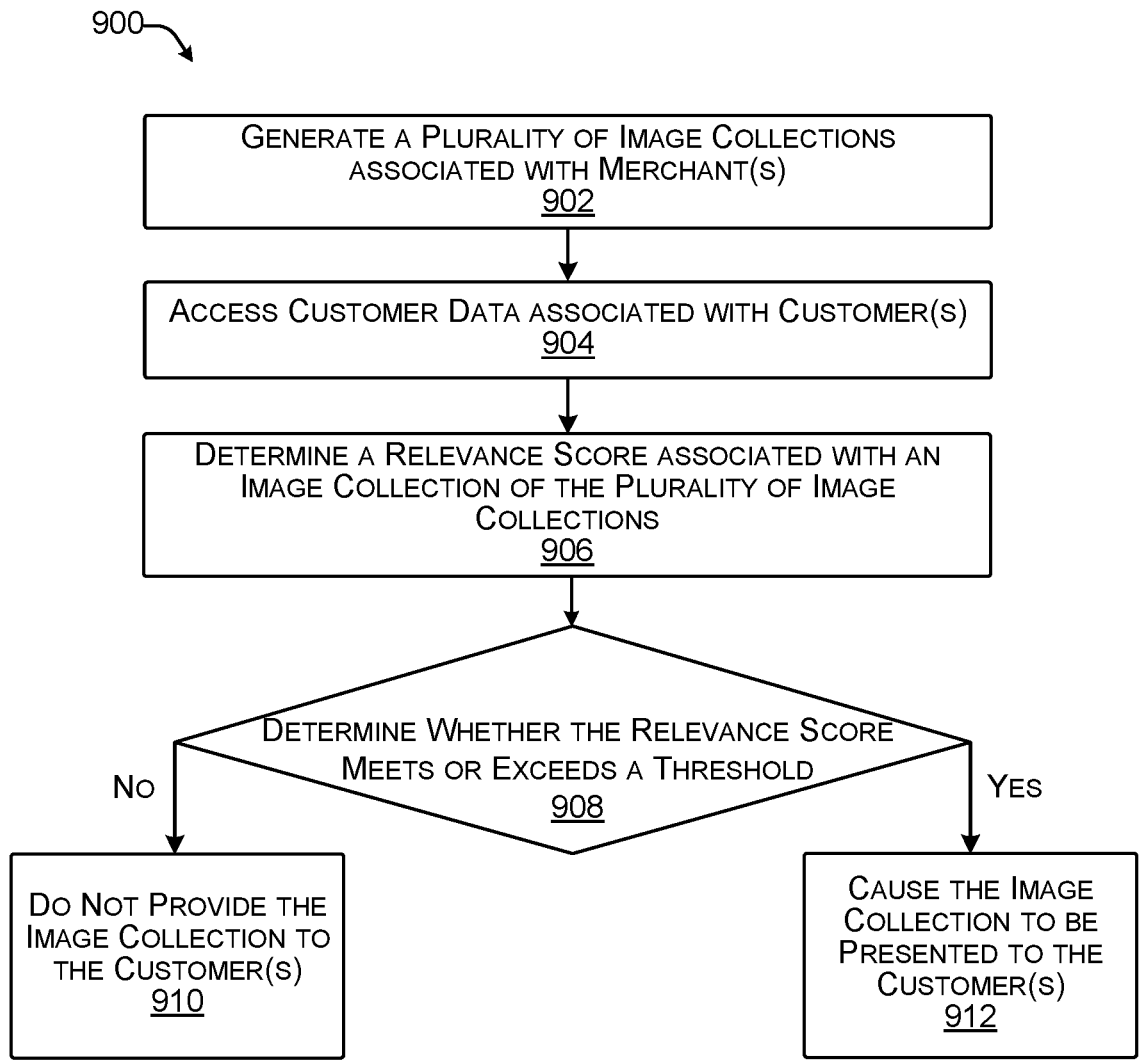
FIG. 9 illustrates an example process for selecting particular image collections based on customer data, as described herein.

FIG. 9 illustrates an example process 900 for selecting particular image collections based on customer data, as described herein.

Block 902 illustrates generating a plurality of image collections associated with merchant(s). FIG. 5, described above, describes a process 500 for generating an image collection. In at least one example, the interactive image generation module 116 can generate multiple image collections associated with one or more merchants.

Block 904 illustrates accessing customer data associated with customer(s). As described above, the payment processing service can store customer profiles associated with customers (e.g., of merchants that utilize the payment processing service). A customer profile can be associated with customer data, as described above. In at least one example, the interactive image generation module 116 can access customer data associated with a plurality of customers.

Block 906 illustrates determining a relevance score associated with an image collection of the plurality of image collections. In such examples, the interactive image generation module 116 can use customer data (of a single customer or multiple customers) to determine which image collection is most relevant to the customer(s) associated with the customer data. In some examples, the interactive image generation module 116 can use a machine-trained model, statistical analysis, etc. to determine a relevance score indicating a relevance between a particular image collection and one or more customers. As a non-limiting example, a relevance score associated with customers that have a transaction history indicating that they have purchased fishing supplies in the past and an image collection associated with outdoor gear can be higher than a relevance score associated with such customers and an image collection associated with high-end fashion apparel.

In at least one example, the machine-trained model can be trained via a machine learning mechanism. In such an example, the model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the model can be trained on training data associated with a plurality of customers and data associated with image collections (e.g., subjects, item(s) included, merchant(s), merchant data associated with such merchant(s), sales data, conversion rates, etc.). As a result, the machine-trained model can output a relevance score indicating a similarity between a customer and an image collection, which can be based on customer data associated the customer data associated with image collections (e.g., subjects, item(s) included, merchant(s), merchant data associated with such merchant(s), sales data, conversion rates, etc.).

Block 908 illustrates determining whether the relevance score meets or exceeds a threshold. In an example, the interactive image generation module 116 can compare the relevance score with a threshold to determine whether the relevance score meets or exceeds the threshold. Based on determining that the relevance score does not meet or exceed the threshold, the interactive image generation module 116 can refrain from providing the image collection to the customer(s), as illustrated in block 910. Based on determining that the relevance score meets or exceeds the threshold, the interactive image generation module 116 can cause the image collection to be presented to the customer(s), as illustrated in block 912.

Figure 10:
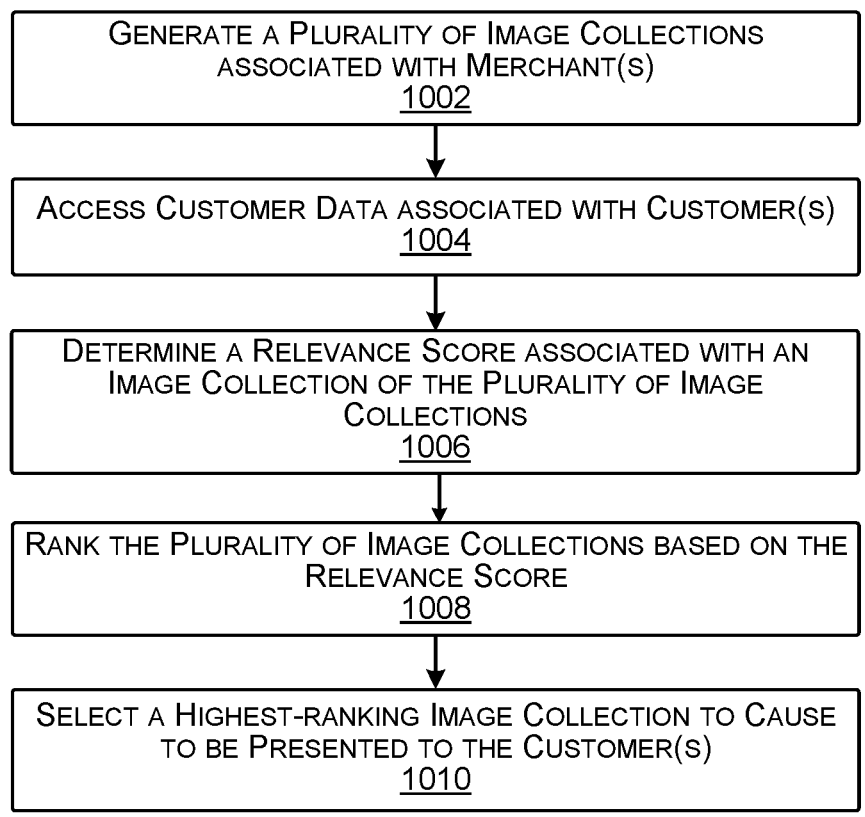
FIG. 10 illustrates an example process for selecting particular image collections based on customer data, as described herein.

FIG. 10 illustrates an example process 1000 for selecting particular image collections based on customer data, as described herein.

Block 1002 illustrates generating a plurality of image collections associated with merchant(s). FIG. 5, described above, describes a process 500 for generating an image collection. In at least one example, the interactive image generation module 116 can generate multiple image collections associated with one or more merchants.

Block 1004 illustrates accessing customer data associated with customer(s). As described above, the payment processing service can store customer profiles associated with customers (e.g., of merchants that utilize the payment processing service). A customer profile can be associated with customer data, as described above. In at least one example, the interactive image generation module 116 can access customer data associated with a plurality of customers.

Block 1006 illustrates determining a relevance score associated with an image collection of the plurality of image collections. In such examples, the interactive image generation module 116 can use customer data (of a single customer or multiple customers) to determine which image collection is most relevant to the customer(s) associated with the customer data. In some examples, the interactive image generation module 116 can use a machine-trained model, statistical analysis, etc. to determine a relevance score indicating a relevance between a particular image collection and one or more customers, as described above with reference to FIG. 9.

Block 1008 illustrates ranking the plurality of image collections based on the relevance score. In an example, the interactive image generation module 116 can rank image collections based on relevance scores and can select a highest-ranking image collection to cause to be presented to the customer(s), as illustrated in block 1010.

Figure 11:
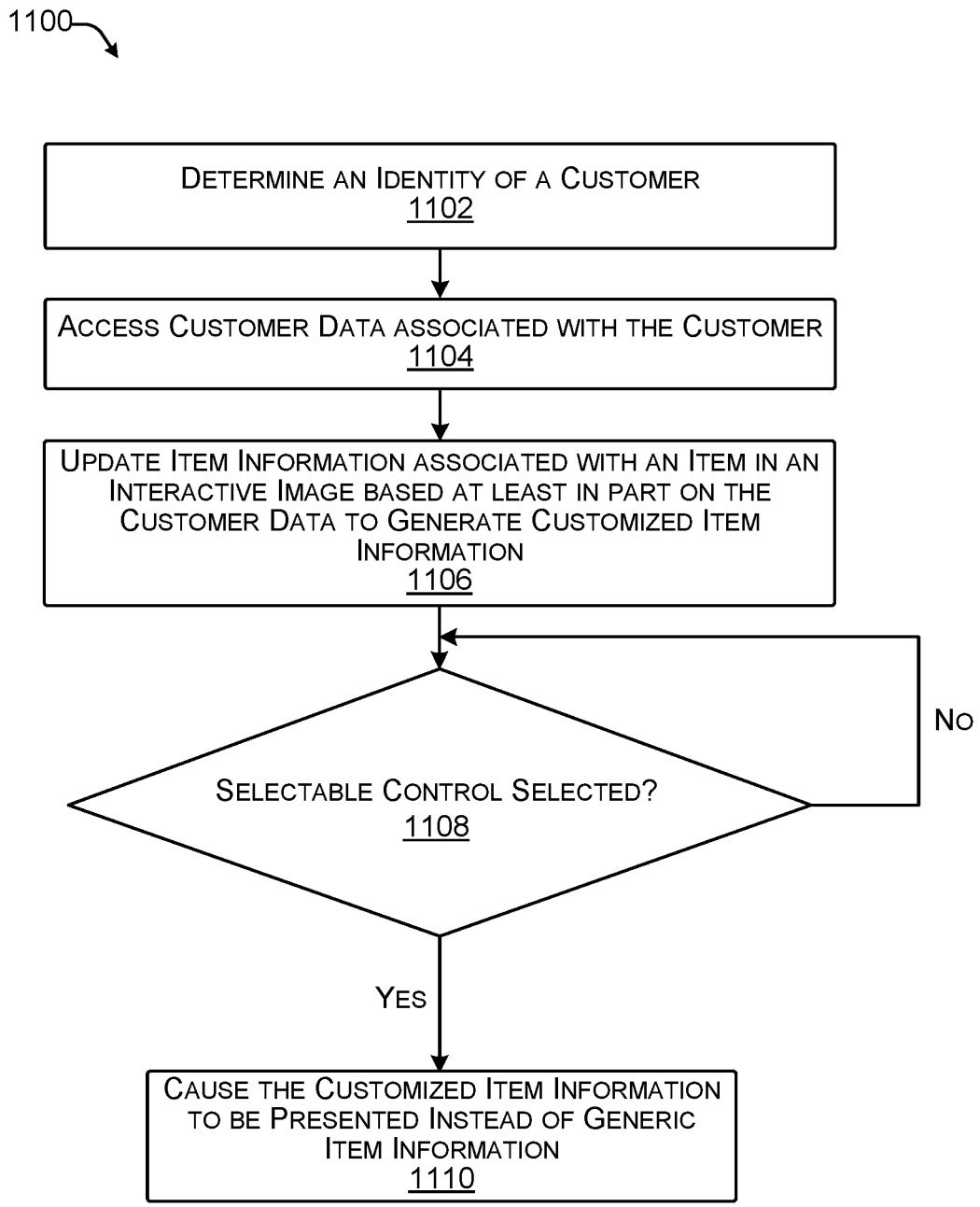
FIG. 11 illustrates an example process for personalizing item information associated with item(s) in the image collection based on customer data, as described herein.

FIG. 11 illustrates an example process 1100 for personalizing item information associated with item(s) in the image collection based on customer data, as described herein.

Block 1102 illustrates determining an identity of a customer. As described above, customers can be associated with customer identifiers, such as account log-ins, phone numbers, email addresses, etc. In some examples, the interactive image generation module 116 can receive a request for an image collection from a customer device. For instance, in at least one example, a customer can interact with a customer device to request an image collection. In such an example, the interactive mage generation module 116 can utilize the customer identifier associated with the request to determine an identity of a customer. In other examples, the payment processing service can prompt a customer to provide a customer identifier and can determine an identity of the customer based on the provided customer identifier.

Block 1104 illustrates accessing customer data associated with the customer. In at least one example, the customer identifier can be associated with a customer profile. Responsive to determining the identity of the customer, the interactive image generation module 116 can access the customer profile corresponding to the customer identifier.

Block 1106 illustrates updating item information associated with an item in an interactive image based at least in part on the customer data to generate customized item information. In at least one example, the interactive image generation module 116 can determine item information based on the customer data. As an example, the interactive image generation module 116 can compare item information associated with an item in the inventory database 108 with customer data associated with the customer to determine customer-specific item information. Such customer-specific item information can be associated with a selectable control corresponding to the item. For instance, the interactive image generation module 116 can compare inventory data with customer data to determine a particular size of a shirt, color of a shirt, etc. and such customer-specific item information can be associated with a selectable control corresponding to a shirt.

Block 1108 illustrates determine whether a selectable control corresponding to the item is selected. As described above, a selectable control can be a user interface element (e.g., a shape, a graphic, a text, etc.) that can be actuated via interaction with a user interface. For instance, a customer can provide a touch input via a touch display to actuate (or "select") the selectable control. Or, a customer can click on the selectable control using another input/output device (e.g., a mouse, etc.).

Block 1110 illustrates causing the customized item information to be presented instead of generic item information. Responsive to receiving an indication that the selectable control corresponding to the item is selected, the payment processing system can cause the customer-specific item information to be presented via a user interface instead of generic item information (e.g., not personal to the customer).

If the selectable control is not selected, process 1100 can wait until a selectable control is selected before presenting customized item information to the customer.

Figure 12:
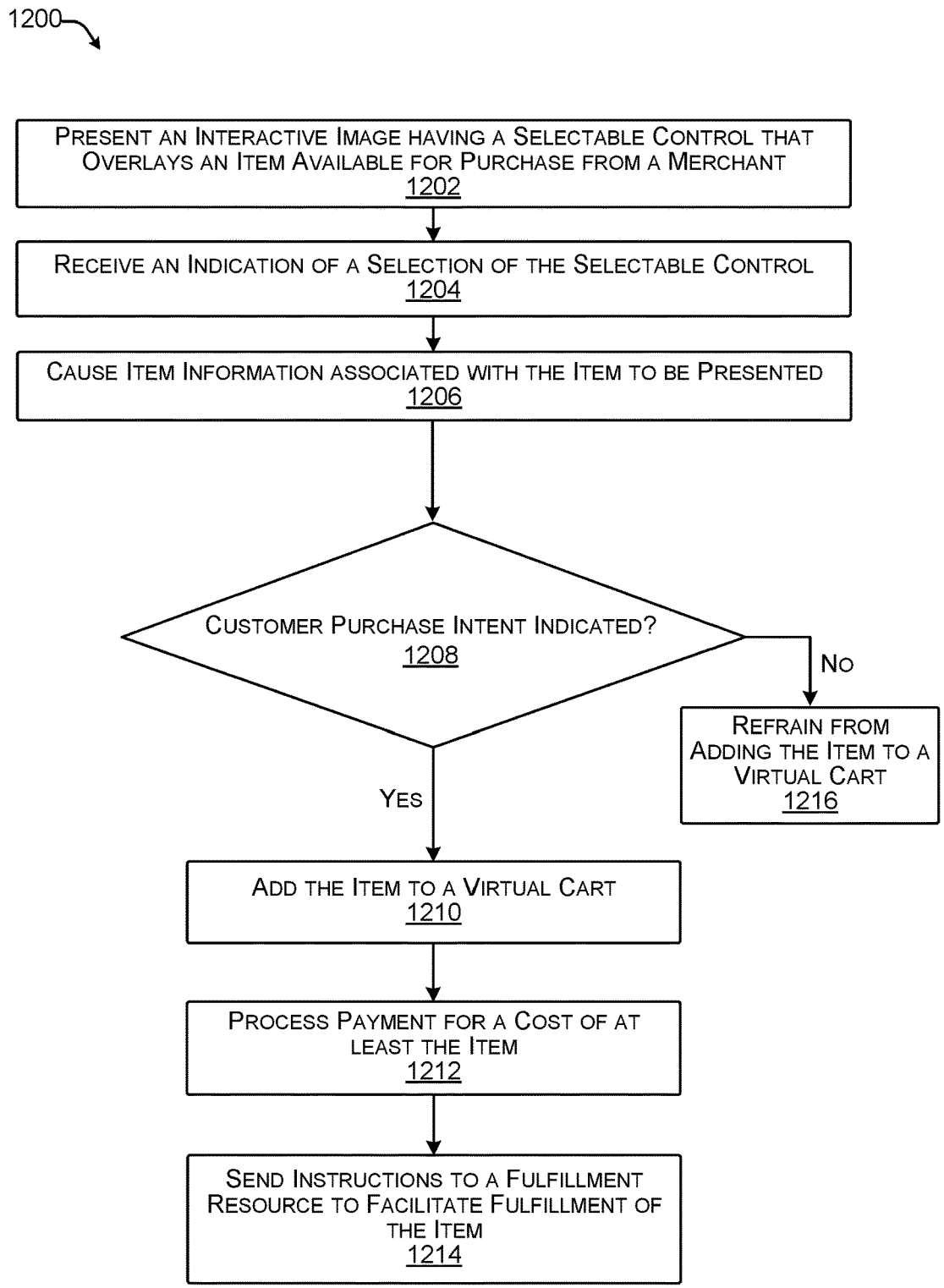
FIG. 12 illustrates an example process for interacting with an interactive image to, for example, add item(s) to a virtual cart, as described herein.

FIG. 12 illustrates an example process 1200 for interacting with an interactive image to, for example add item(s) to a virtual cart, as described herein. In at least one example, the payment processing service can be associated with server computing devices storing one or more functional components that are executable by processors such as the image processing module 104, the identification module 106, the inventory database 108, and the interactive image generation module 116 described above with reference to FIG. 1. In additional or alternative examples, the interactive image generation module 116 can include additional or alternative functional component(s), such as an interaction module and/or a merchant module. Additional details associated with each are described below.

Block 1202 illustrates presenting an interactive image having a selectable control that overlays an item available for purchase from a merchant. In at least one example, the interactive image generation module 116 can send one or more interactive images to the interaction module. The interaction module can cause the one or more interactive images to be presented via a user interface, such as user interface 202 described above with reference to FIG. 2. In at least one example, the interaction module can cause the interactive image(s) to be presented via a common access point, such as a web browser, an application, etc. In such examples, the interaction module can push the interactive image(s) to the common access point. In other examples, the interaction module can receive a request to access the interactive image(s) from the common access point and can send the interactive image(s) responsive to receiving the request. In additional or alternative examples, the interaction module can send a personalized (or otherwise private) access point to a customer, such as an email, text message, push notification, etc. that includes a link or other means to access the interactive image(s). Actuation of the link or other access means can cause interactive image(s) to be presented to the customer.

Block 1204 illustrates receiving an indication of a selection of the selectable control. As described above, a selectable control can be a user interface element (e.g., a shape, a graphic, a text, etc.) that can be actuated via interaction with a user interface. For instance, a customer can provide a touch input via a touch display to actuate (or "select") the selectable control. Or, a customer can click on the selectable control using another input/output device (e.g., a mouse, etc.). In at least one example, an interaction with a selectable control can enable a customer to perform an action associated with the item to which the selectable control corresponds. Such an action can be viewing item information associated with the item, adding the item to a virtual cart, etc.

Block 1206 illustrates causing item information associated with the item to be presented. In some examples, item information can be stored in association with the selectable control. That is, the user interface 202 can receive the indication of the selection and can cause the item information to be presented via the user interface 202 without communicating with the server(s). In other examples, an access point to access the item information can be stored in association with the selectable control. In such examples, the user interface 202 send the indication of the selection of the selectable control to the interaction module and the interaction module can access the item information associated with the item from the resource corresponding to the access point (e.g., the inventory database 108). The interaction module can send the item information to the user interface 202 to enable the item information to be presented via the user interface 202. In at least one example, as described above with reference to FIG. 11, the item information can be customized for a customer.

Block 1208 illustrates determining whether a customer's purchase intent is indicated. In at least one example, the customer can interact with another selectable control that, when selected, enables the customer to add the item to a virtual cart. In at least one example, responsive to receiving an indication that a customer desires to purchase the item, the user interface 202 can send an indication to the interaction module indicating that the customer desires to purchase the item. The interaction module can transmit the indication to the merchant module and the merchant module can add the item to a virtual cart, as illustrated in block 1210. In at least one example, the merchant module can send an indication to the user interface 202 to update the virtual cart. In some examples, the user interface 202 can add the item to a virtual cart that is stored locally, without transmitting the indication that the customer desires to purchase the item to the server(s) of the payment processing service until the customer is ready to close-out or otherwise settle the transaction.

Block 1212 illustrates processing payment for a cost of at least the item. When a customer is ready to close-out or otherwise settle the transaction (e.g., submit payment information for a cost of item(s) in the virtual cart), the customer can provide payment data associated with a payment instrument to the merchant.

In some examples, if the user interface 202 is presented via a merchant device, the merchant device can include or can be connectable to a reader device for reading payment instruments. In some examples, the reader device can plug in to a port in the merchant device, such as a microphone/headphone port, a data port, or other suitable port. The reader device can include a read head for reading a magnetic strip of a payment card, and further can include encryption technology for encrypting the information read from the magnetic strip. Additionally or alternatively, the reader device can be an EMV payment reader, which in some examples, can be embedded in the merchant device. Moreover, numerous other types of readers can be employed with the merchant device herein, depending on the type and configuration of the merchant device. In such examples, the merchant device can execute a POS application that configures the merchant device as a POS terminal. In such examples, the POS application and/or the reader device can obtain payment data associated with a payment instrument of the customer.

In an additional or alternative example, if the user interface 202 is presented via a customer device, the customer can input payment data via the user interface 202, for instance, to complete a card not present transaction. In other examples, payment data of a customer can be stored in association with a customer profile and the customer can provide an identifier to access and use the stored payment data for processing the transaction. Further, in yet an additional or alternative example, a customer can use a gift card, a loan (e.g., provided by the payment processing service), a credit, or another payment instrument to satisfy the cost of the transaction.

The merchant device and/or the customer device can transmit the payment data to the merchant module at the server(s) of the payment processing service and the merchant module can process payment for the cost of at least the item. That is, the merchant module can send a request to authorize the payment data for a cost of at least the item to a payment network associated with the payment instrument. The payment network can send an indication whether the payment instrument is authorized (or not). Based on receiving an indication that the payment instrument is authorized, the merchant module can authorize the transaction and, in some examples, can send an indication to the merchant device communicating such.

Block 1214 illustrates sending instructions to a fulfillment resource to facilitate fulfillment of the item. In at least one example, the merchant module can send an instruction to a fulfillment resource to facilitate fulfillment of the item. Fulfillment resources can include brick-and-mortar stores of merchants, warehouses, fulfillment centers, etc. In some examples, the merchant module can determine an appropriate fulfillment resource for a customer based on customer preferences and/or other customer data associated with a customer profile. For instance, if the customer desires to pick-up the item from a brick-and-mortar store, the merchant module can send an instruction to a merchant device at the brick-and-mortar store to retrieve the item and provide the item to the customer when the customer arrives at the brick-and-mortar store. Or, if the customer is shopping in a location remote from his/her home, the merchant module can determine a brick-and-mortar store near the customer's home to send an instruction or can send an instruction to a warehouse and/or other fulfillment center to ship the item to the customer's home.

In some examples, a merchant's inventory can indicate that the merchant does not have the item in stock. In such an example, the merchant module can determine another merchant that has the item in stock and can send an instruction to the other merchant. In some examples, the merchant module can identify a similar merchant, a proximate merchant, etc. to fulfill an order for an item that the merchant does not have the item in stock. In some examples, the merchant module can provide a reward or incentive, or facilitate a cost-sharing model to compensate both merchants (the merchant associated with the interactive image and the merchant that ultimately fulfilled the order).

In some examples, if the customer does not indicate a desire to purchase the item, the merchant module can refrain from adding the item to a virtual cart, as illustrated in block 1216.

Figure 13:
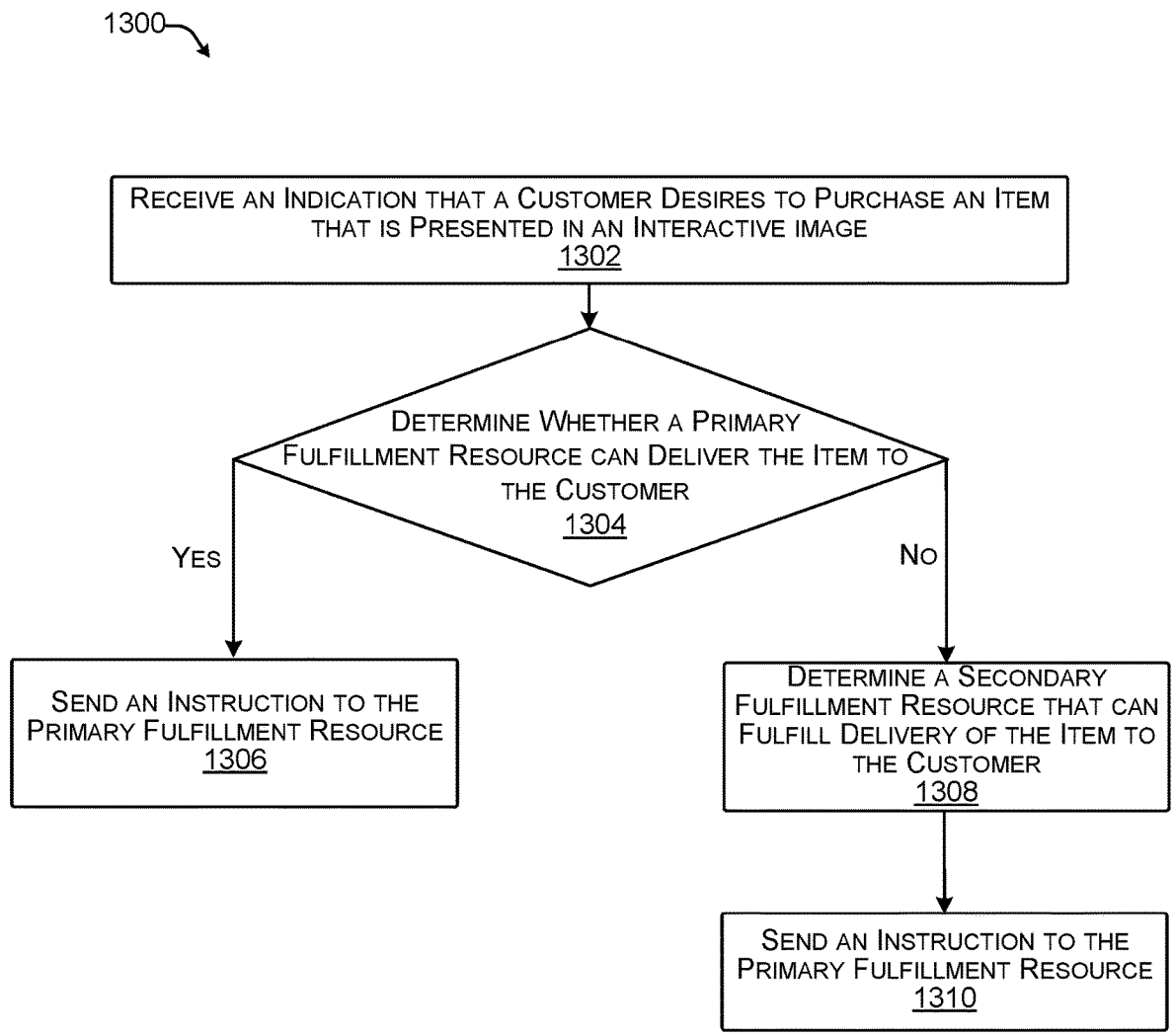
FIG. 13 illustrates an example process for facilitating fulfillment of item(s) added to a virtual cart via interaction with an interactive image, as described herein.

FIG. 13 illustrates an example process 1300 for facilitating fulfillment of item(s) added to a virtual cart via interaction with an interactive image, as described herein.

Block 1302 illustrates receiving an indication that a customer desires to purchase an item that is presented in an interactive image. In at least one example, the customer can interact with a selectable control presented in association with an interactive image that, when selected, enables the customer to add the item to a virtual cart. In at least one example, responsive to receiving an indication that a customer desires to purchase the item, the user interface 202 can send an indication to the interaction module indicating that the customer desires to purchase the item. The interaction module can transmit the indication to the merchant module and the merchant module can add the item to a virtual cart. In at least one example, the merchant module can send an indication to the user interface 202 to update the virtual cart. In some examples, the user interface 202 can add the item to a virtual cart that is stored locally, without transmitting the indication that the customer desires to purchase the item to the server(s) of the payment processing service until the customer is ready to close-out or otherwise settle the transaction.

When a customer is ready to close-out or otherwise settle the transaction (e.g., submit payment information for a cost of item(s) in the virtual cart), the customer can provide payment data associated with a payment instrument to the merchant, for instance, via a merchant device and/or a customer device. The merchant device and/or the customer device can transmit the payment data to the merchant module at the server(s) of the payment processing service and the merchant module can process payment for the cost of at least the item. That is, the merchant module can send a request to authorize the payment data for a cost of at least the item to a payment network associated with the payment instrument. The payment network can send an indication whether the payment instrument is authorized (or not). Based on receiving an indication that the payment instrument is authorized, the merchant module can authorize the transaction and, in some examples, can send an indication to the merchant device communicating such.

Block 1304 illustrates determining whether a primary fulfillment resource can deliver the item to the customer. In at least one example, the merchant module can access the inventory database 108 to determine whether the merchant with whom the interactive image is associated has the item in stock and is available to deliver, or otherwise provide, the item to the customer. That is, the merchant module can determine whether the primary fulfillment resource can deliver the item to the customer. If the merchant has the item in stock and is available to deliver, or otherwise provide, the item to the customer, the merchant module can send an instruction to the primary fulfillment resource, as illustrated in block 1306. However, in some examples, a merchant's inventory can indicate that the merchant does not have the item in stock and thus, the merchant cannot deliver the item to the customer. That is, the primary fulfillment resource is not available.

In such an example, the merchant module can determine another merchant that has the item in stock and can send an instruction to the other merchant. That is, the merchant module can determine a secondary fulfillment resource, as illustrated in block 1308. In some examples, the merchant module can identify a similar merchant, a proximate merchant, etc. to fulfill an order for an item that the merchant does not have the item in stock. As such, the merchant module can send an instruction to the secondary fulfillment resource, as illustrated in block 1310. In some examples, the merchant module can provide a reward or incentive, or facilitate a cost-sharing model to compensate both merchants (the merchant associated with the interactive image and the merchant that ultimately fulfilled the order).

In some examples, the merchant module can determine that a merchant's inventory does not include a particular item prior to the time for fulfillment. For instance, in some examples, the merchant module can determine that a merchant is out of an item at a time corresponding to when a customer adds the item to the virtual cart. In such examples, the merchant module can determine whether another merchant has the item in stock at that time and can suggest the other merchant to the customer. The customer can then opt to purchase the item from the other merchant via interacting with the user interface 202 to add the item (offered by the other merchant) to the virtual cart.

FIG. 14 depicts an illustrative block diagram illustrating a system 1400 for performing techniques as described herein. The system 1400 includes merchant device(s) 1402 and customer device(s) 1404 that communicate with server(s) 1406 via network(s) 1408 (e.g., the Internet, cable network(s), cellular network(s), wireless network(s) (e.g., Wi-Fi) and wired network(s), as well as close-range communications such as Bluetooth®, Bluetooth® low energy, and the like).

In at least one example, the merchant device(s) 1402 can be any suitable type of computing device, e.g., portable, semi-portable, semi-stationary, or stationary. Some examples of the merchant device(s) 1402 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. In at least one example, the merchant device(s) 1402 can include, among other functional components, instance(s) of the user interface 202 as described above with respect to FIG. 2.

In at least one example, the customer device(s) 1404 can be any suitable type of computing device, e.g., portable, semi-portable, semi-stationary, or stationary. Some examples of the customer device(s) 1404 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. In at least one example, the customer device(s) 1404 can include, among other functional components, instance(s) of the user interface 202 as described above with respect to FIG. 2.

The server(s) 1406 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1406 as being present in a single location, these components and data can alternatively be distributed across different computing devices and different locations in any manner. In some examples, such components and data can be distributed across merchant device(s) 1402 and/or customer device(s) 1404. The functions can be implemented by one or more server computing devices, with the various functionality described above distributed in various ways across the different computing devices. Multiple server(s) 1406 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1406 can include one or more processors 1410, one or more computer-readable media 1412, one or more communication interfaces 1414, and one or more input/output devices 1416. Each processor 1410 can be a single processing unit or a number of processing units, and can include single or multiple computing units or multiple processing cores. The processor(s) 1410 can be implemented as one or more microprocessors, microcomputers, microcontrollers, digital signal processors, central processing units, state machines, logic circuitries, and/or any devices that manipulate signals based on operational instructions. For example, the processor(s) 1410 can be one or more hardware processors and/or logic circuits of any suitable type specifically programmed or configured to execute the algorithms and processes described herein. The processor(s) 1410 can be configured to fetch and execute computer-readable instructions stored in the computer-readable media 1412, which can program the processor(s) 1410 to perform the functions described herein.

The computer-readable media 1412 can include volatile and nonvolatile memory and/or removable and non-removable media implemented in any type of technology for storage of information, such as computer-readable instructions, data structures, program modules, or other data. Such computer-readable media 1412 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1406, the computer-readable media 1412 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1412 can be used to store any number of functional components that are executable by the processors 1410. In many implementations, these functional components comprise instructions or programs that are executable by the processors 1410 and that, when executed, specifically configure the one or more processors 1410 to perform the actions attributed above to the service provider and/or payment processing service. Functional components stored in the computer-readable media 1412 can include the image processing module 104, the identification module 106, the interactive image generation module 116, an interaction module 1418, and a merchant module 1420. At least some of the functionality associated with the identification module 116, the interactive image generation module 116, the interaction module 1418, and the merchant module 1420 is described above with reference to FIGS. 1-13. Additional functional components stored in the computer-readable media 1412 can include an operating system 1422 for controlling and managing various functions of the server(s) 1406. In at least one example, the computer-readable media 1412 can include or maintain other functional components and data, such as other modules and data 1424, which can include programs, drivers, etc., and the data used or generated by the functional components. Further, the server(s) 1406 can include many other logical, programmatic and physical components, of which those described above are merely examples that are related to the discussion herein.

In at least one example, the computer-readable media 1412 can store one or more databases. In additional or alternative examples, one or more databases can be remotely located and accessible to the computer-readable media 1412. The one or more databases can include the inventory database 128 (e.g., storing inventory data), a customer database 1426 (e.g., storing customer profiles), and a merchant database 1428 (e.g., storing merchant profiles). Such databases and the data stored therein are described above with reference to FIGS. 1-13. While depicted and described as databases, in additional or alternative examples, the databases can be any type of data storage or data repository.

The communication interface(s) 1414 can include one or more interfaces and hardware components for enabling communication with various other devices, such as over the network(s) 1408. For example, communication interface(s) 1414 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The server(s) 1406 can further be equipped with various input/output (I/O) devices 1416. Such I/O devices 1416 can include a display, various user interface controls (e.g., buttons, joystick, keyboard, mouse, touch screen, etc.), audio speakers, connection ports and so forth.

The aforementioned description is directed to devices and applications that are related, in part, to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments. Techniques described herein can be configured to operate in both real-time/online and offline modes. Further, techniques described herein are directed to transactions between customers and merchants, but such techniques can be applicable for any type of entity and should not be limited to use by customers and merchants.

While the aforementioned disclosure makes reference to user interactions via a UI presented via a display of a device, the UI can be presented via any input/output device. As an example, the UI can be output via a speaker, and augmented reality (AR) display, a virtual reality (VR) display, etc. That is, in some examples, the interactive image(s) can be presented via a speaker or an augmented reality and/or virtual reality environment. VR is an immersive experience, which simulates physical presence in a real or imagined environment. For example, a VR environment can immerse a physical, real-world person with computer-generated graphics (e.g., a dog, a castle, etc.) in a computer-generated, virtual scene via a VR display device. AR is a hybrid reality experience, which merges real worlds and virtual worlds. AR is a technology that produces AR environments where a physical, real-world person and/or objects in physical, real-world scenes co-exist with virtual, computer-generated people and/or objects in real time. For example, a AR environment can augment a physical, real-world scene and/or a physical, real-world person with computer-generated graphics (e.g., a dog, a castle, etc.) in the physical, real-world scene viewed via a AR display device.

Further, while the aforementioned disclosure makes reference to the merchant and/or customer interacting with the UI via a selectable control, in additional or alternative examples, the merchant can indicate a selection via a spoken input or other type of input.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method comprising:

storing, in an inventory data structure associated with a server computing device of a payment processing service, inventory data associated with a plurality of merchants, wherein the payment processing service authorizes payment for transactions associated with the plurality of merchants;

receiving, by the server computing device and via input to a graphical user interface presented by a third-party platform different from the payment processing service, an indication that (1) a customer of a plurality of customers is interested in purchasing an item and (2) a preference for fulfillment of the item at a first brick-and-mortar store of a first merchant of the plurality of merchants, wherein the item is accessible on the third-party platform;

determining, by the server computing device and based at least in part on the inventory data, that the item is unavailable at the first brick-and-mortar store;

determining, by the server computing device, that the item is available at a second brick-and-mortar store of a second merchant of the plurality of merchants, wherein a similarity between the first merchant and the second merchant meets a similarity threshold;

based at least in part on determining that the item is available at the second brick-and-mortar store, generating, by the server computing device, an interactive component corresponding to the item, the interactive component comprising:
an image of the item; and
a selectable control to initiate a purchase of the item from the second merchant; and
causing presentation, by the server computing device, of the interactive component via the graphical user interface, wherein customer-specific item variant information is overlaid on the graphical user interface responsive to selection of the selectable control, and wherein the selection of the selectable control enables the customer to add the item to a virtual cart displayed via the graphical user interface.

2. The computer-implemented method as claim 1 recites, wherein the image of the item is provided by at least one of the third-party platform or the second merchant.

3. The computer-implemented method as claim 1 recites, wherein generating the interactive component is further based at least in part on transaction data associated with transactions of the plurality of customers and the second merchant.

4. The computer-implemented method as claim 1 recites, wherein generating the interactive component is further based at least in part on at least one of at least one preference of the customer or at least one characteristic of the customer.

5. The computer-implemented method as claim 1 recites, further comprising:
receiving, by the server computing device, an indication of selection of the selectable control to initiate the purchase of the item; and
based at least in part on receiving the indication of the selection, processing, by the server computing device, payment for the purchase of the item.

6. The computer-implemented method as claim 1 recites, wherein generating the interactive component comprises overlaying the selectable control on the image.

7. The computer-implemented method as claim 1 recites, wherein the indication that the customer is interested in purchasing the item comprises image data, and wherein determining that the item is unavailable at the first brick-and-mortar store is, based at least in part on the image data and the inventory data.

8. The computer-implemented method as claim 1 recites, wherein the selection of the selectable control causes display of the virtual cart via the graphical user interface.

9. The computer-implemented method as claim 1 recites, wherein generating the interactive component comprises positioning the selectable control within a threshold distance of the image.

10. The computer-implemented method as claim 1 recites, wherein the input to the graphical user interface comprises selection of one of a plurality of shoppable images, wherein the graphical user interface comprises the plurality of shoppable images.

11. The computer-implemented method as claim 1 recites, wherein the image of the item comprises an image corresponding to the customer-specific item variant information.

12. The computer-implemented method as claim 1 recites, where the graphical user interface is presented via a computing device associated with the first merchant.

13. The computer-implemented method as claim 1 recites, wherein the image is based at least in part on a previously purchased item previously purchased by the customer.

14. The computer-implemented method as claim 1 recites, wherein generating the interactive component is further based at least in part on customer behavior data.

15. A system associated with a payment processing service, the system comprising:
an inventory data structure storing inventory data associated with one or more merchants associated with the payment processing service, wherein the inventory data is associated with items offered for sale by the one or more merchants;
one or more processors; and
one or more non-transitory computer-readable media comprising instructions, that when executed by the one or more processors, causes the system to perform operations comprising:
receiving, by one or more servers of the payment processing service and via input to a graphical user interface presented by a third-party platform different from the payment processing service, an indication that (1) a customer of a plurality of customers is interested in purchasing an item and (2) a preference for fulfillment of the item at a first brick-and-mortar store of a first merchant of the one or more merchants, wherein the item is accessible on the third-party platform, and wherein the payment processing service authorizes payment for transactions associated with the one or more merchants;
determining, by the one or more servers of the payment processing service and based at least in part on the inventory data, that the item is unavailable at the first brick-and-mortar store;
determining, by the one or more servers of the payment processing service, that the item is available at a second brick-and-mortar store of a second merchant of the one or more merchants, wherein a similarity between the first merchant and the second merchant meets a similarity threshold;
based at least in part on determining that the item is available at the second brick-and-mortar store, generating, by the one or more servers of the payment processing service, an interactive component corresponding to the item, the interactive component comprising:
an image of the item; and
a selectable control to initiate a purchase of the item from the second merchant; and
causing presentation, by the one or more servers of the payment processing service, of the interactive component via the graphical user interface presented by the third-party platform, wherein customer-specific item variant information is overlaid on the graphical user interface responsive to selection of the selectable control, and wherein the selection of the selectable control enables the customer to add the item to a virtual cart displayed via the graphical user interface.

16. The system as claim 15 recites, wherein receiving the indication that the customer is interested comprises receiving the indication via one or more servers of the third-party platform.

17. The system as claim 15 recites, wherein the image of the item comprises one image of a plurality of images of items comprising a composite image, wherein the composite image includes selectable controls for individuals of the plurality of images.

18. A computer-implemented method comprising:
storing, in an inventory data structure associated with a server computing device of a payment processing service, inventory data associated with a plurality of merchants, wherein the payment processing service authorizes payments for transactions associated with the plurality of merchants;

receiving, by the server computing device via input to a graphical user interface presented by a third-party platform, an indication that a customer of a plurality of customers is interested in purchasing an item and (2) a preference for fulfillment of the item at a first brick-and-mortar store of a first merchant of the plurality of merchants;

determining, by the server computing device and based at least in part on the inventory data, that the item is unavailable at the first brick-and-mortar store;

determining, by the server computing device, that the item is available at a second brick-and-mortar store of a second merchant of the plurality of merchants, wherein a similarity between the first merchant and the second merchant meets a similarity threshold;

based at least in part on determining that the item is available at the second brick-and-mortar store, generating, by the server computing device, an interactive component corresponding to the item, the interactive component comprising an image of the item overlaid by a selectable control to initiate a purchase of the item from the second merchant; and causing presentation, by the server computing device, of the interactive component via the graphical user interface presented by the third-party platform, wherein customer-specific item variant information is overlaid on the graphical user interface responsive to selection of the selectable control, and wherein the selection of the selectable control enables the customer to add the item to a virtual cart displayed via the graphical user interface.

19. The computer-implemented method as claim 18 recites, wherein the third-party platform comprises a common access point between a customer device associated with the customer and the server computing device.

20. The computer-implemented method as claim 18 recites, wherein the selectable control is configured to be hidden until it is determined that the customer is within a threshold distance of the selectable control.

* * * * *